United States Patent
Tobari et al.

(10) Patent No.: US 12,341,448 B2
(45) Date of Patent: Jun. 24, 2025

(54) POWER CONVERSION DEVICE

(71) Applicant: Hitachi Industrial Equipment Systems Co., Ltd., Tokyo (JP)

(72) Inventors: Kazuaki Tobari, Tokyo (JP); Yuta Iwase, Tokyo (JP); Yoshiyuki Taguchi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 37 days.

(21) Appl. No.: 18/274,509

(22) PCT Filed: Jan. 24, 2022

(86) PCT No.: PCT/JP2022/002487
§ 371 (c)(1),
(2) Date: Jul. 27, 2023

(87) PCT Pub. No.: WO2022/239307
PCT Pub. Date: Nov. 17, 2022

(65) Prior Publication Data
US 2024/0097589 A1    Mar. 21, 2024

(30) Foreign Application Priority Data

May 14, 2021   (JP) .................. 2021-082831

(51) Int. Cl.
*H02P 21/24*    (2016.01)
*H02P 21/18*    (2016.01)
*H02P 27/06*    (2006.01)

(52) U.S. Cl.
CPC .............. *H02P 21/18* (2016.02); *H02P 21/24* (2016.02); *H02P 27/06* (2013.01)

(58) Field of Classification Search
CPC .......... H02P 21/24; H02P 21/06; H02P 21/18; H02P 27/06; H02M 7/48
See application file for complete search history.

(56) References Cited

U.S. PATENT DOCUMENTS

2008/0265809 A1 * 10/2008 Oi .................. H02P 21/06
                                              318/722
2012/0268046 A1    10/2012 Yamazaki et al.
(Continued)

FOREIGN PATENT DOCUMENTS

| CN | 112332445 A | 2/2021 |
| JP | 2006-197712 A | 7/2006 |

(Continued)

OTHER PUBLICATIONS

International Search Report (PCT/ISA/210) issued in PCT Application No. PCT/JP2022/002487 dated Mar. 29, 2022 with English translation (4 pages).
(Continued)

*Primary Examiner* — Cortez M Cook
(74) *Attorney, Agent, or Firm* — Crowell & Moring LLP

(57) ABSTRACT

A power conversion device comprising, a power converter that outputs signal to the motor to vary the motor's output frequency, output voltage and output current and control unit that controls the power converter, the control unit is, calculating the first power from the output voltage and output current, calculating the second power from the output current, electrical circuit parameters and frequency estimates, calculating the first phase error estimate so that the first power follows the second power in the first frequency domain, calculating the second phase error estimate different from the first frequency domain in a second frequency domain, controlling the frequency estimates so that the first phase error estimate or the second phase error estimate follows the command value of the phase error estimate.

6 Claims, 16 Drawing Sheets

(56) References Cited

U.S. PATENT DOCUMENTS

| | | |
|---|---|---|
| 2019/0222158 A1 | 7/2019 | Taniguchi et al. |
| 2021/0273591 A1 | 9/2021 | Tobari et al. |
| 2023/0299700 A1* | 9/2023 | Tobari ................. H02P 21/24 318/400.02 |

FOREIGN PATENT DOCUMENTS

| | | | | |
|---|---|---|---|---|
| JP | 2018-42321 A | | 3/2018 | |
| JP | 2020-88978 A | | 6/2020 | |
| JP | 2022045784 A | * | 3/2022 | ............. H02M 7/48 |
| WO | WO 2006/014150 A1 | | 2/2006 | |

OTHER PUBLICATIONS

Japanese-language Written Opinion (PCT/ISA/237) issued in PCT Application No. PCT/JP2022/002487 dated Mar. 29, 2022 (3 pages).
Extended European Search Report issued in European Application No. 22807014.0 dated Mar. 3, 2025 (15 pages).

* cited by examiner

POWER CONVERSION DEVICE

TECHNICAL FIELD

This invention relates to power conversion devices.

BACKGROUND ART

As a stable and highly accurate control method in the low-speed range of position sensorless control, there is a technique, as described in the patent document 1, to estimate the frequency of the magnet motor by calculating the reactive power based on the voltage command value to the power converter, current detection value, electric circuit parameters of the magnet motor, and frequency estimates. The frequency of the magnet motor is estimated by calculating the reactive power based on the voltage command to the power converter, current detection, electric circuit parameters of the magnet motor, and frequency estimates.

CITATION LIST

Patent Document

Patent Documents 1 Japanese Unexamined Patent Publication No. 2006-197712

SUMMARY OF THE INVENTION

Problems to be Solved by the Invention

The technology described in the literature 1 calculates two kinds of reactive power (Q and Q hat) and calculates frequency estimates of the inverter to set the deviation ΔQ to zero. This allows the frequency estimates to be less sensitive to temperature changes in the magnet motor winding resistance, resulting in highly accurate control characteristics.

By the way, there are cases where speed control is performed using different techniques for high frequency (medium-high speed) and low frequency (low speed). In such cases, for example, in the low-speed range, the first motor frequency is estimated so that the deviation ΔQ is zero by calculating two types of reactive power using the technology of Patent Document 1. On the other hand, in the medium to high speed range, for example, another technique is used to estimate the phase error (phase of control and magnet motor) using the extended induced voltage, and the second motor frequency is estimated by PI control to follow the zero. When the first motor frequency and the second motor frequency are switched between the low-speed range and the medium- to high-speed range, if there is a difference between the two frequencies, torque shock (torque fluctuation) due to current change may occur.

In addition, by making the magnet motor less sensitive to temperature changes in the magnet motor winding resistance, stable and highly accurate control characteristics are required without the need to adjust electrical circuit parameters such as resistance values.

The purpose of this invention is to provide a power conversion device with stable and accurate control characteristics that can prevent torque shock when the motor frequency changes and does not require adjustment of electrical circuit parameters.

Present invention is a power conversion device comprising a power converter outputting signals to the motor to vary the output frequency, output voltage and output current of the motor, a control unit controlling the power converter wherein the control unit is calculating the first power from the output voltage and the output current, calculating the second power from the output current, electrical circuit parameters and a frequency estimates, calculating the first phase error estimate in a first frequency domain so that the first power follows the second power, calculating the second phase error estimate in a second frequency domain different from the first frequency domain, controlling the frequency estimates so that the first phase error estimate or the second phase error estimate follows the command value of the phase error estimate.

Effects of the Invention

The invention can prevent torque shock when the motor frequency changes, as well as provide stable and highly accurate control characteristics without the need to adjust electrical circuit parameters.

MODE FOR CARRYING OUT THE INVENTION

The following drawings are used to explain this example in detail. The same reference numbers are used for common configurations in each figure. The examples described below are not limited to the illustrated examples.

Example 1

Figure 1:
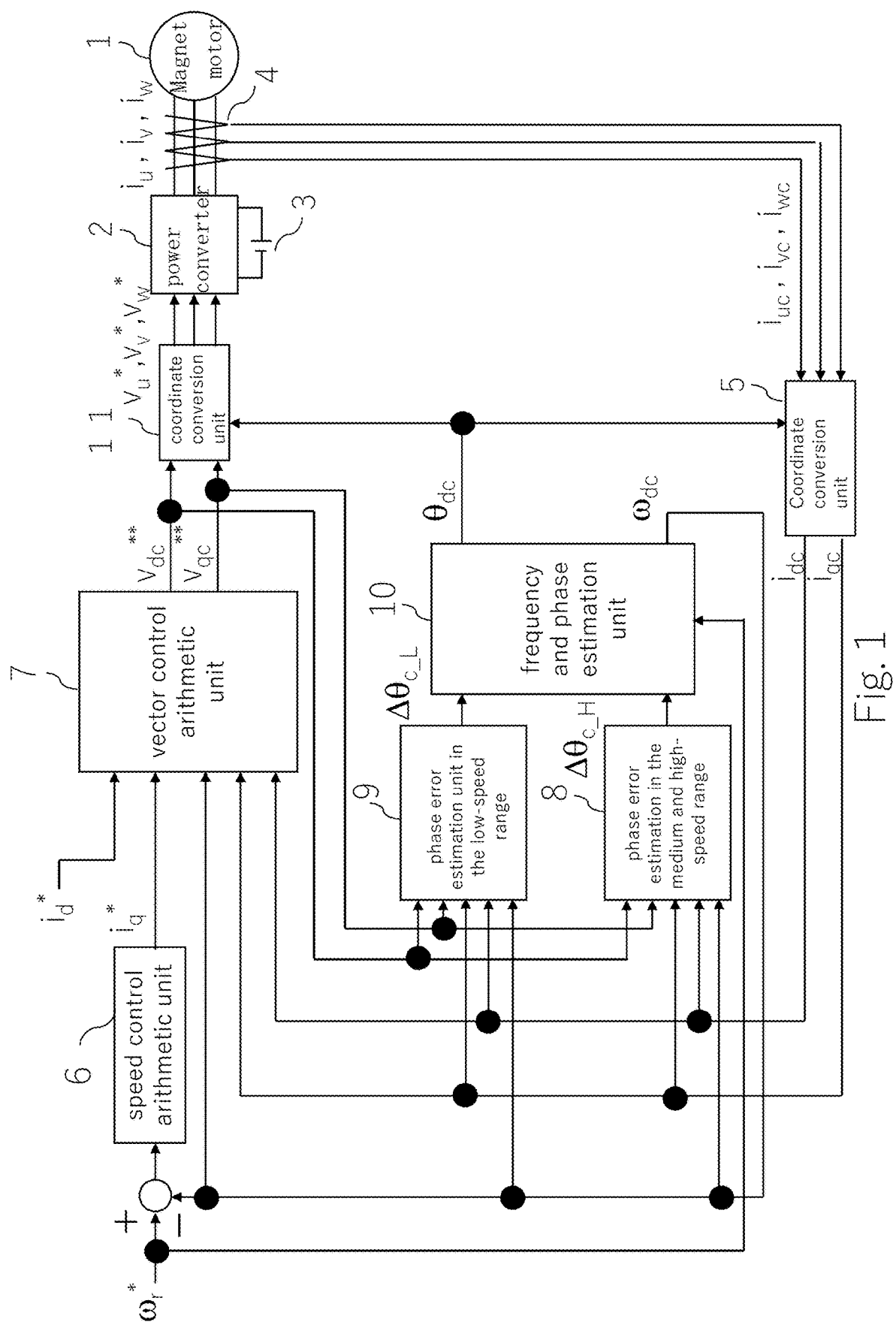
FIG. 1: System configuration diagram of power conversion device and other devices in example 1.

FIG. 1 shows the system configuration with power conversion device and magnet motor in example 1.

The power conversion device in this example achieves stable and highly accurate control characteristics even in the low-speed range, which is about 10% of the base frequency from standstill, in position sensor-less control that omits encoders and other devices that detect the magnet motor's magnet phase.

Magnet motor 1 outputs motor torque that is a composite of the torque component due to the magnetic flux of the permanent magnet and the torque component due to the inductance of the armature winding.

Power converter 2 is equipped with semiconductor devices as switching elements. Power converter 2 inputs 3-phase ac voltage command values $v_u^*$, $v_v^*$ and $v_w^*$ and outputs voltage values proportional to 3-phase ac voltage command values $v_u^*$, $v_v^*$ and $v_w^*$. Based on the output of power converter 2, magnet motor1 is driven and the output voltage value, output frequency value and output current of magnet motor1 are controlled variably. Insulated gate bipolar transistor (IGBT) may be used as switching element.

DC power supply 3 supplies DC voltage and DC current to power converter 2.

The current detector 4 outputs $i_{u\_c}$, $i_{v\_c}$ and $i_{w\_c}$, which are the detected three phases AC currents $i_u$, $i_v$ and $i_w$ of the magnet motor 1. The current detector 4 also detects the three phases AC currents of two of the magnet motor1, e.g., phase u and phase w. The AC current of phase v may be obtained from the AC condition ($i_u+i_v+i_w=0$) as $i_v=-(i_u+i_w)$.

In this example, the current detector 4 is shown in the power conversion device, but it can also be located outside the power conversion device.

The control unit includes coordinate conversion unit 5, speed control arithmetic unit 6, vector control arithmetic unit 7, phase error estimation in the medium and high-speed range 8, phase error estimation unit in the low-speed range 9, frequency and phase estimation unit10, and coordinate conversion unit11. The control unit controls the output of power converter 2 so that the output voltage value, output frequency value and output current of magnet motor1 are controlled variably.

The control section is composed of semiconductor integrated circuits (arithmetic and control means) such as microcomputer and digital signal processor (DSP). Any or all of the control section can be implemented by hardware such as an ASIC (Application Specific Integrated Circuit) or FPGA (Field Programmable Gate Array). The CPU (Central Processing Unit) of the control section reads a program held in a memory or other recording device and executes the processing of each part such as the coordinate conversion unit 5 described above.

Next, each component of the control unit is described.

Coordinate conversion unit 5 outputs d-axis and q-axis current detection values $i_{d\_c}$ and $i_{q\_c}$ from the detected values $i_{u\_c}$, $i_{v\_c}$, and $i_{w\_c}$ of the three phase AC currents $i_u$, $i_v$, and $i_w$ and the phase estimate $\theta_{d\_c}$.

The speed control arithmetic unit 6 calculates the torque command value $\tau^*$ based on the frequency command value $\omega_r^*$ and frequency estimates $\omega_{d\_c}$, and outputs the q-axis current command value $i_q^*$ by dividing by the torque factor. The frequency command value $\omega_r^*$ is used to determine the medium to high speed range and low speed range, and frequency estimates $\omega_{d\_c}$ corresponds to the motor speed estimate (motor rotation speed estimate).

Vector control arithmetic unit 7 outputs d-axis and q-axis current command values $i_d^*$, $i_q^*$, current detection values lac, $i_{q\_c}$, frequency estimates $\omega_{d\_c}$ and d-axis and q-axis voltage calculated based on the electrical circuit parameters of magnet motor1 command value $v_{d\_c}^*$ and $v_{q\_c}^*$ are output.

The phase error estimation in the medium and high-speed range 8 uses the voltage command values $v_{d\_c}^*$, $v_{q\_c}^*$, frequency estimates $\omega_{d\_c}$, current detection values $i_{d\_c}$, $i_{q\_c}$ and electrical circuit parameters of magnet motor 1 for the $d_c$ and $q_c$ axes, which are control axes. The estimated value $\Delta\theta_{c\_H}$ of phase error $\Delta\theta$, which is the deviation between the phase $\theta_{d\_c}$ of control in the medium and high speed range and the phase $\theta_d$ of the magnet motor 1 is output.

The phase error estimation unit in the low-speed range 9 uses the voltage command values $v_{d\_c}^{}$, $v_{q\_c}^{}$, frequency estimates $\omega_{d\_c}$, current detection values $i_{d\_c}$, $i_{q\_c}$ and electrical circuit parameters of magnet motor1 for the $d_c$ and $q_c$ axes, which are control axes. The estimated value $\Delta\theta_{c\_L}$ of the phase error $\Delta\theta$, which is the deviation between the phase $\theta_{d\_c}$ of the control and the phase $\theta_d$ of the magnet motor1 in the low speed range, is calculated.

The frequency and phase estimation unit 10 is based on the phase error estimates at low speeds $\Delta\theta_{c\_L}$ or the estimated phase error in the medium and high speed range $\Delta\theta_{c\_H}$, frequency estimates $\omega_{d\_c}$ and phase estimates $\theta_{d\_c}$ are output.

The coordinate conversion unit 11 outputs the voltage command values $v_u^*$, $v_m^*$ and $v_w^*$ for 3-phase AC from the voltage command values $v_{d\_c}^*$ and $v_{q\_c}^*$ for the $d_c$ and $q_c$ axes and the phase estimate value $\theta_{d\_c}$.

First, the basic operation of the sensor-less vector control scheme when using the phase error estimation unit in the low-speed range 9 is described.

The speed control arithmetic unit 6 calculates the torque command $\tau^*$ and the q-axis current command $i_q^*$ according to (Formula 1) using proportional control and integral control so that the frequency estimates $\omega_{d\_c}$ follow the frequency command value $\omega_r^*$.

[Formula 1]

$$\tau^* = (\omega_r^* - \omega_{dc})\left(K_{sp} + \frac{K_{si}}{s}\right) \quad (1)$$

$$i_q^* = \frac{\tau^*}{3/2 P_m [K_e^* + (L_d^* - L_q^*)i_d^*]}$$

Where $K_{s\_p}$: proportional gain of speed control, $K_{s\_i}$: integral gain of speed control, $P_m$: pole logarithm, $K_e$: induced voltage coefficient, $L_d$: d-axis inductance, $L_q$: q-axis inductance, *: set value, s: Laplace operator The vector control arithmetic unit 7 firstly uses the electrical circuit parameters of the permanent magnet motor 1: the set value of winding resistance $R^*$, the set value of d-axis inductance $L_d^*$, the set value of q-axis inductance $L_q^*$, the value of induced voltage coefficient $K_e^*$, the current command values $i_d^*$ and $i_q^*$ for the $d_c$ axes and $q_c$ axes and frequency estimates $\omega_{d\_c}$ to output the voltage reference values $v_{d\_c}^*$ and $v_q^*$ for the $d_c$ and $q_c$ axes according to (Formula 2).

[Formula 2]

$$\begin{bmatrix} v_{dc}^* = R^* i_d^* - \omega_{dc} L_q^* \frac{1}{1 + Tacr\ s} i_q^* \\ v_{qc}^* = R^* i_q^* + \omega_{dc}\left(L_d^* \frac{1}{1 + Tacr\ s} i_d^* + K_e^*\right) \end{bmatrix} \quad (2)$$

Where $\tau_{a\_c\_r}$: Response time constant of current control

Second, vector control arithmetic unit 7 calculates the voltage correction values $\Delta v_{d\_c}$ and $\Delta v_{q\_c}$ for the $d_c$ and $q_c$ axes according to (Formula 3) using proportional and integral control so that the current detection values $i_{d\_c}$ and $i_{q\_c}$ for each component follow the current command values $i_d^*$ and $i_q^*$ for the $d_c$ and $q_c$ axes.

[Formula 3]

$$\begin{bmatrix} \Delta v_{dc} = \left(K_{pd} + \dfrac{K_{id}}{s}\right)(i_d^* - i_{dc}) \\ \Delta v_{qc} = \left(K_{pq} + \dfrac{K_{iq}}{s}\right)(i_q^* - i_{qc}) \end{bmatrix} \quad (3)$$

Where $K_{p\_d}$: proportional gain of current control of $d_c$ axis, $K_{i\_d}$: integral gain of current control of $d_c$ axis, $K_{p\_q}$: proportional gain of current control of $q_c$ axis, $K_{i\_q}$: integral gain of current control of $q_c$ axis Furthermore, vector control arithmetic unit 7 calculates the voltage command values $v_{d\_c}^*$ and $v_{q\_c}^*$ for the $d_c$ and $q_c$ axes according to (Formula 4).

[Formula 4]

$$\begin{bmatrix} v_{dc}^{**} = v_{dc}^* + \Delta v_{dc} \\ v_{qc}^{**} = v_{qc}^* + \Delta v_{qc} \end{bmatrix} \quad (4)$$

Figure 2:
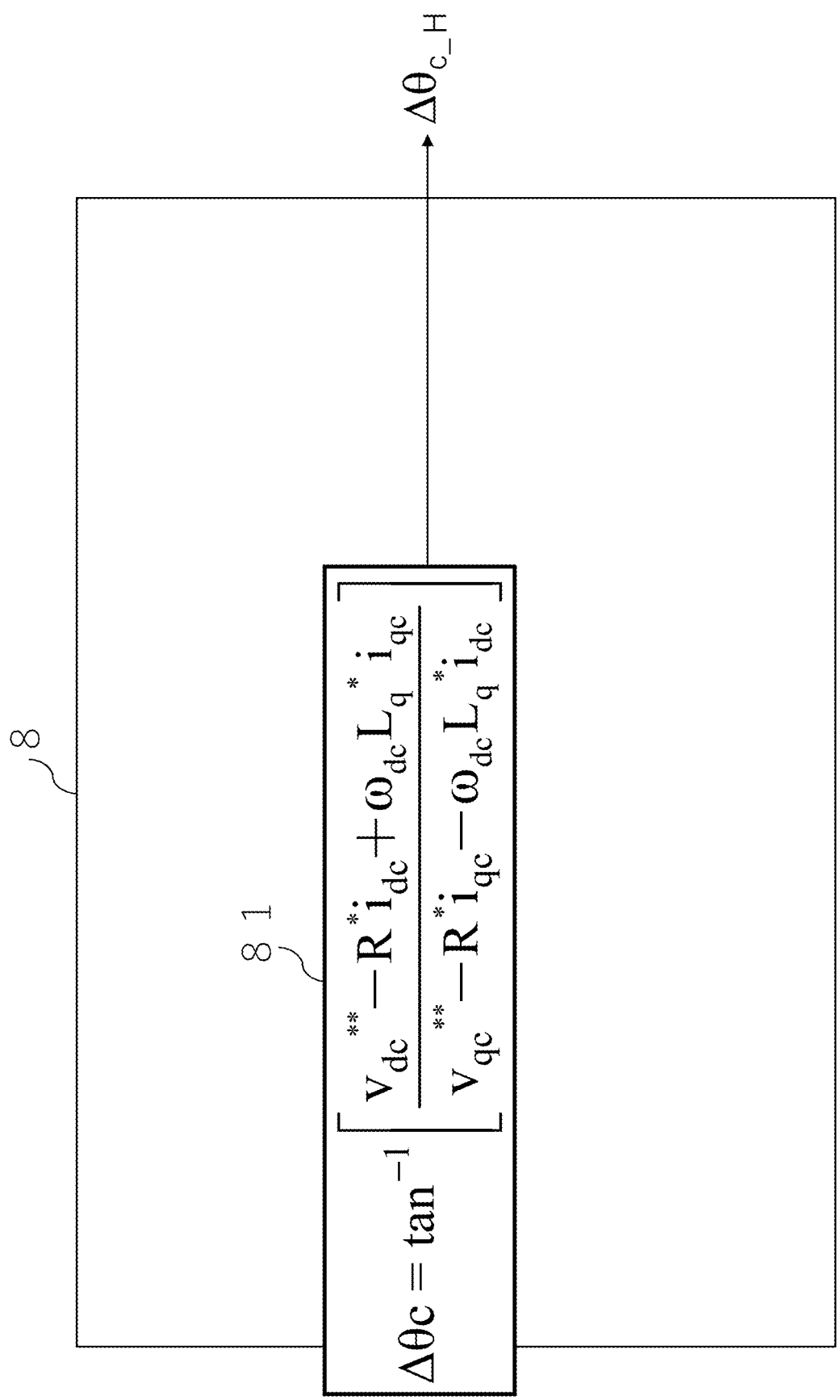
FIG. 2: Configuration diagram of the estimation calculation section of the phase error using the extended induced voltage in the high-speed range.

FIG. 2 shows the block of phase error estimation in the medium and high-speed range 8.

Phase error estimation in the medium and high-speed range 8 is based on the voltage command values $v_{d\_c}^*$, $v_{q\_c}^*$ of dc axis and qc and current detection values $i_{d\_c}$ and $i_{q\_c}$ and the electrical circuit parameters of magnet motor 1 ($R^*$ and $L_q^*$), the calculation section 81 of the phase error estimates in the medium and high-speed range using the extended induced voltage method calculates the phase error estimates $\Delta\theta_{c\_H}$ in the medium and high-speed range according to (Formula 5).

[Formula 5]

$$\Delta\theta c\_H = \tan^{-1}\left(\dfrac{v_{dc}^{**} - R^* i_{dc} + \omega_{dc} L_q^* i_{qc}}{v_{qc}^{**} - R^* i_{qc} - \omega_{qc} L_q^* i_{dc}}\right) \quad (5)$$

Figure 3:
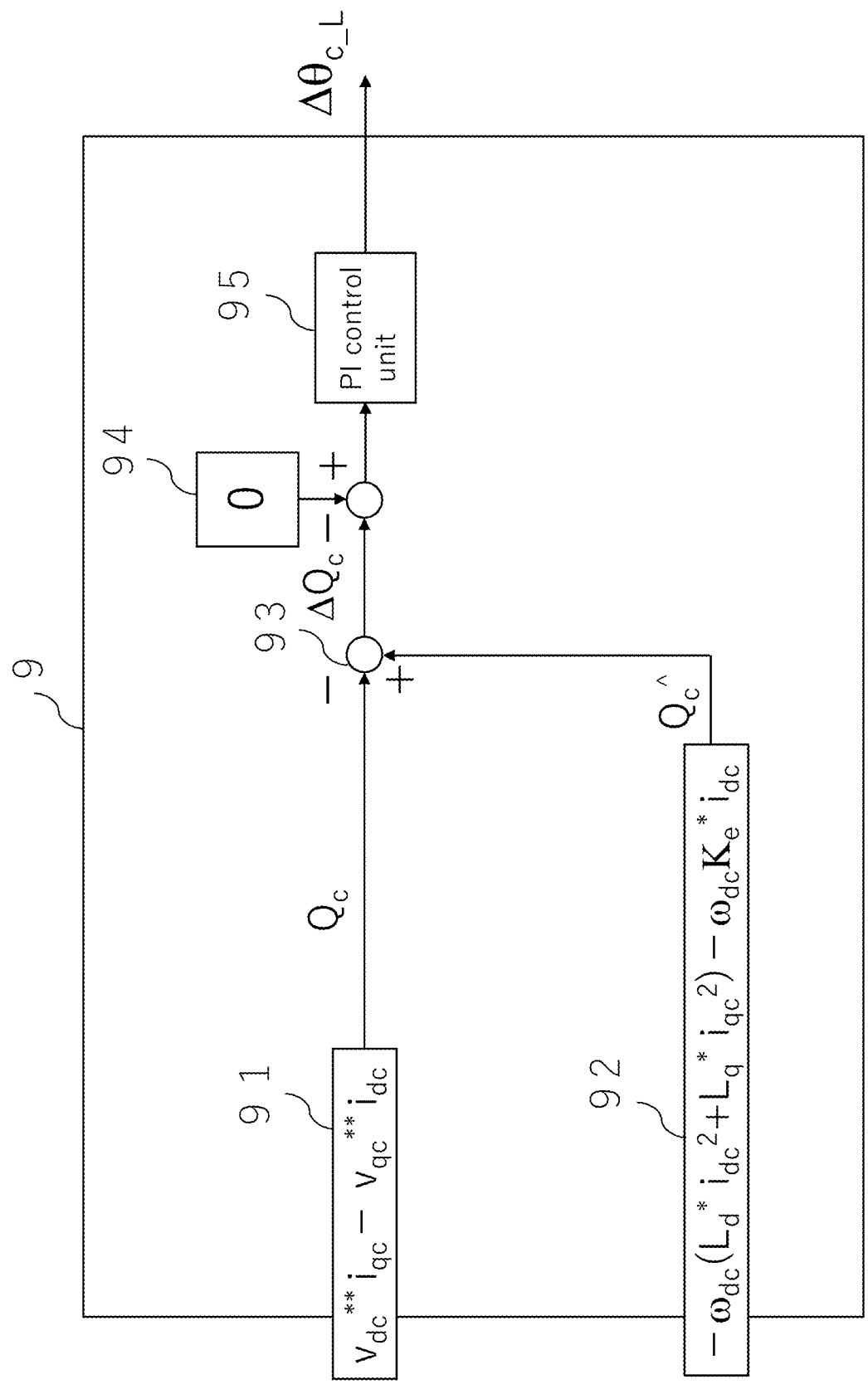
FIG. 3: Configuration diagram of the estimation calculation section of the phase error in the low-speed range in example 1.

The phase error estimation unit in the low-speed range 9 is explained here. FIG. 3 shows the blocks of the phase error estimation unit in the low-speed range 9.

The phase error estimation unit in the low-speed range 9 calculates the first reactive power $Q_{q\_c}^*$ in the first reactive power calculation unit 91 using the voltage command values $v_{d\_c}^*$ of the $d_c$ axis and v of the $q_c$ axis as the output voltage of magnet motor 1 and the voltage command values v of the q axis as the output current of magnet motor 1 The first reactive power $Q_c$ is calculated according to (Formula 6) using the current detection values $i_{d\_c}$ of the $d_c$ axis and $i_{q\_c}$ of the $q_c$ axis as the output current of magnet motor 1.

[Formula 6]

$$Q_c = v_{dc}^{} i_{q\_c} - v_{q\_c}^{} i_{dc} \quad (6)$$

The second reactive power calculation section 92 calculates the second reactive power $Q_c\hat{}$ using the current detection values $i_{d\_c}$ of the $d_c$ axis and the current detection values $i_{q\_c}$ of the $q_c$ axis, frequency estimates $\omega_{d\_c}$ and the electrical circuit parameters of magnet motor 1 ($L_d^*$, $L_q^*$ and $K_e^*$) according to (Formula 7).

[Formula 7]

$$Q_c\hat{} = -\omega_{dc}(L_d^* i_{dc}^2 + L_q^* i_{q\_c}^2) - \omega_{dc} K_e^* i_{dc} \quad (7)$$

The first reactive power $Q_c$ and second reactive power $Q_c\hat{}$ are input to the subtraction section 93, and the deviation, $\Delta Q_C$, is calculated. The deviation of reactive power, $\Delta Q_c$, is input to PI control calculation section 95 (hereinafter referred to as PI control section) to follow the command value of reactive power deviation 94 which is "0." The PI control section 95 calculates the estimated value of phase error $\Delta\theta_{c\_L}$ of the phase error $\Delta\theta$ in the low speed range according to (Formula 8) using P (proportional)+I (integral) control calculation.

Figure 4:
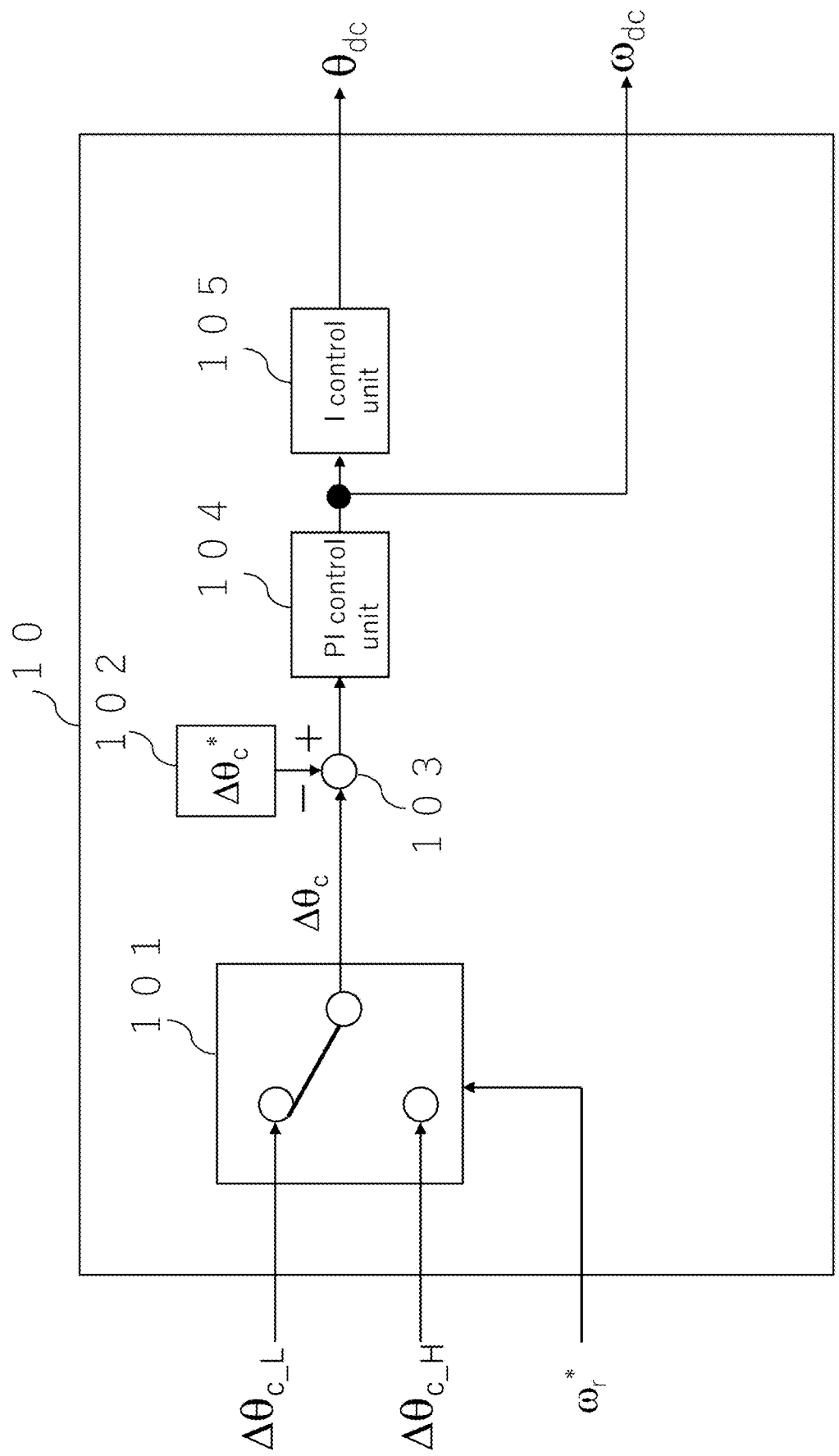
FIG. 4: Configuration diagram of the frequency and phase estimation unit in example 1.

[Formula 8]

$$\Delta\theta c\_L = \left(K_{p\theta} + \dfrac{K_{i\theta}}{s}\right)(0 - \Delta Q_c) \quad (8)$$

Where $K_{p\,\theta}$: proportional gain of the phase error estimation calculation, $K_{i\,\theta}$: integral gain of the phase error estimation calculation The frequency and phase estimation unit 10 is described below. FIG. 4 shows the blocks of frequency and phase estimation unit 10.

The switching section 101 receives the phase error estimates $\Delta\theta_{c\_L}$ in the low-speed range, the phase error estimates $\Delta\theta_{c\_H}$ in the medium- to high-speed range, and the frequency command value $\omega_r^*$. The switching section 101 outputs $\Delta\theta_c = \Delta\theta_{c\_L}$ for the low-speed range and $\Delta\theta_c = \Delta\theta_{c\_H}$ for the medium- to high-speed range as phase error estimates $\Delta\theta_c$ depending on the magnitude of the frequency command value $\omega_r^*$.

In the subtraction section 103, the deviation between the phase error estimate $\Delta\theta_c$ and $\Delta\theta_c^*$ is input to the PI control section 104 so that the aforementioned phase error estimates $\Delta\theta_c$ tracks the phase error command value $\Delta\theta_c^*$ 102. The PI control section 104 uses P (proportional)+I (integral) control operations to the frequency estimates $\omega_{d\_c}$ is calculated according to (Formula 9). In addition, the I control arithmetic section (I control section) 105 calculates the phase estimate $\theta_{d\_c}$ according to (Formula 10) based on the output of the PI control section 104.

[Formula 9]

$$\omega_{dc} = \left(Kp_{pll} + \dfrac{Ki_{pll}}{s}\right)(\Delta\theta_c^* - \Delta\theta_c) \quad (9)$$

Where $Kp_{p\_l\_l}$: proportional gain of PLL control, $Ki_{p\_l\_l}$: integral gain of PLL control

[Formula 10]

$$\theta dc = \dfrac{1}{s} \cdot \omega_{dc} \quad (10)$$

The principle of the stable and highly accurate control characteristics of the present invention will be explained next.

Figure 5:
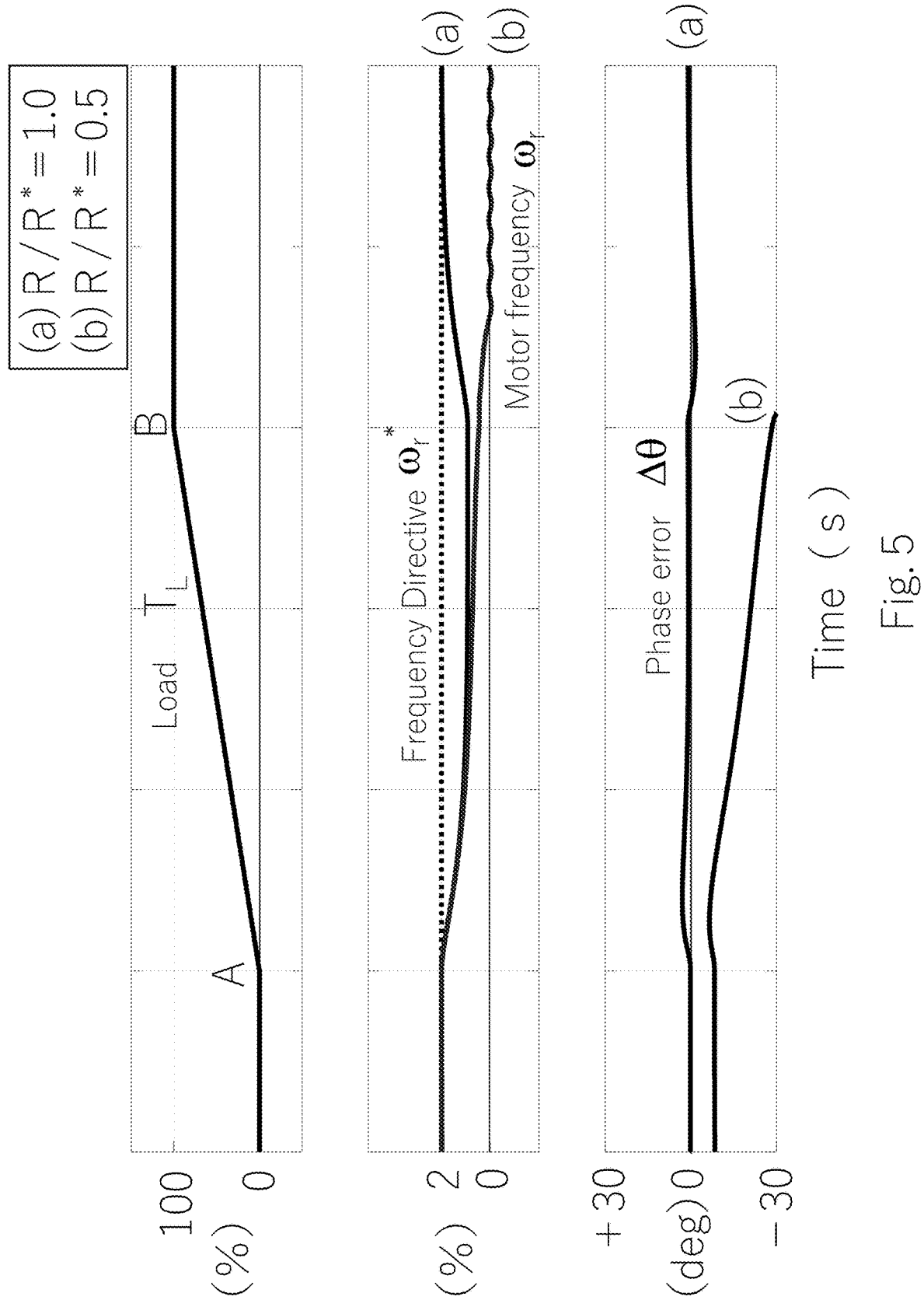
FIG. 5: Control characteristics when the extended induced voltage method for the medium and high-speed range is used in the low speed range.

FIG. 5 shows the control characteristics when the phase error estimation unit in the low-speed range 9 is not used ($\Delta Q_{c\_H}$ is used). The frequency command value $\omega_r^*$ is set to 2% of the base frequency. (When there is no error in the voltage command values $v_{d\_c}^{}$ and $v_{q\_c}^{}$ of the $d_c$ and $q_c$ axes shown in (Formula 2) and the set value R* of the resistance value R included in the calculation formula for the phase error in the medium- and high-speed range shown in (Formula 5), (a) R*/R=1 (base).

The simulation results of (a) and (b) are shown in FIG. 5, assuming (b) R*/R=0.5 when there is an error in the resistance R setting R*.

In FIG. 5, the upper row shows the load torque $T_L$, the middle row shows the frequency command $\omega_r^*$ and the motor frequency co and the lower row shows the phase error $\Delta\theta$. The load torque in the form of a ramp begins to be applied at time point A in the figure and is varied to 100% at time point B. The load torque remains applied from the right after point B.

(a) When R*/R=1 (reference) is set, the phase error $\Delta\theta$ is zero at steady state and the motor frequency co, matches the frequency command $\omega_r^*$. (b) When R*/R=0.5 is set, the phase error $\Delta\theta$ increases "negatively" and the motor frequency $\omega_r$ is stagnant near zero and magnet motor1 is out of step.

In this example, first reactive power $Q_c$ is calculated from (Formula 6) using the voltage command values $v_{d\_c}^{}$, $v_{q\_c}^{}$ and current detection values $i_{d\_c}$, $i_{q\_c}$ of the $d_c$ and $q_c$ axes. In addition, second reactive power $Q_c\hat{}$ is calculated from (Formula 7) using the current detection values $i_{d\_c}$, $i_{q\_c}$, frequency estimates $\omega_{d\_c}$ of the $d_c$ and $q_c$ axes and the set values of the electrical circuit parameters of magnet motor1 ($L_d^*$, $L_q^*$, $K_e^*$).

The phase error estimates $\Delta\theta_{c\_L}$ in the low-speed range are automatically adjusted from (Formula 8) to track the deviation between $Q_c\hat{}$ and $Q_c$ to zero, which is the result of the calculation, and the estimated value $\Delta\theta_{c\_L}$ is used in the frequency and phase estimation unit10 to reduce sensitivity to the resistance value, thereby improving control characteristics. The control characteristics can be improved.

Figure 6:
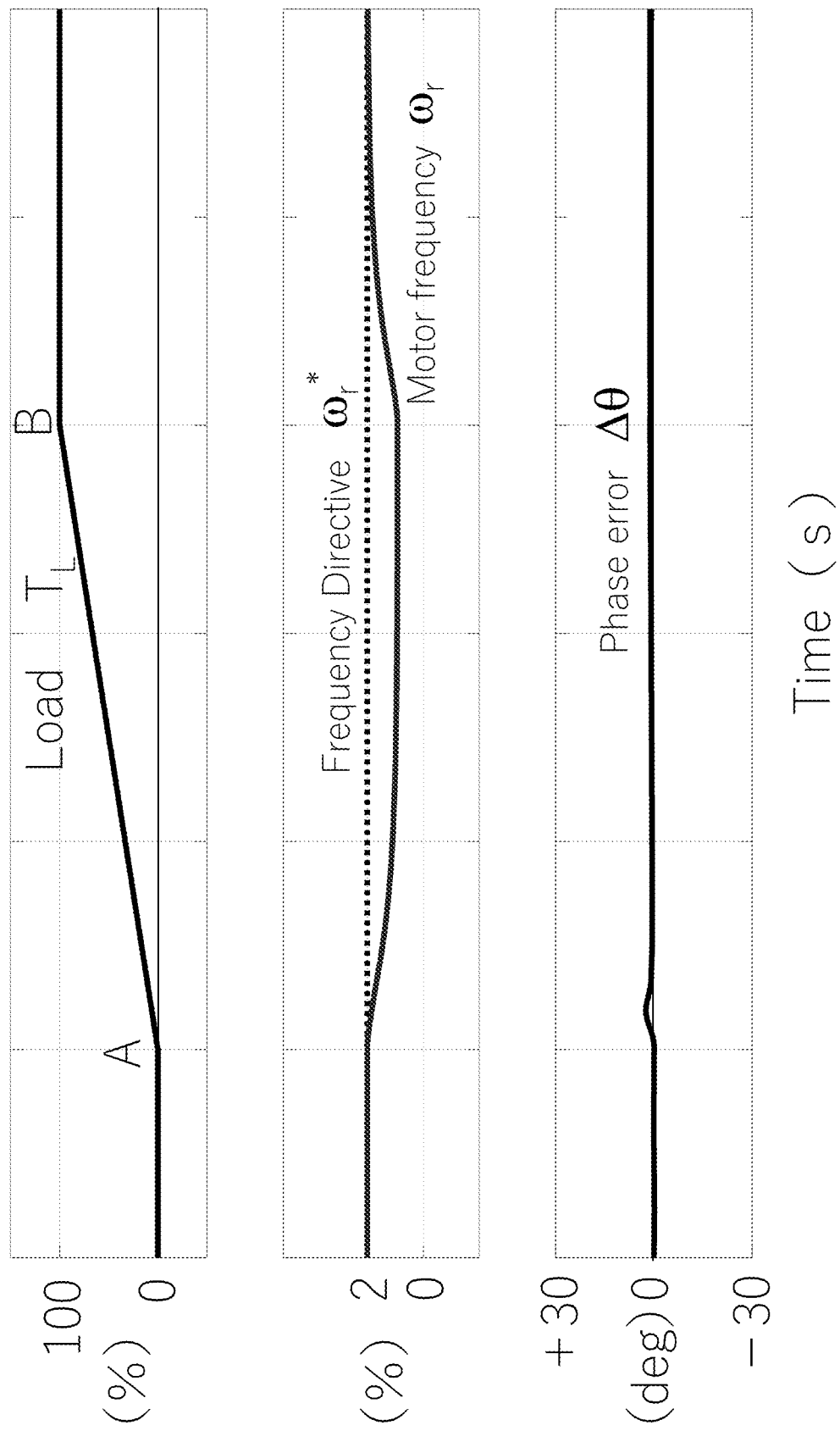
FIG. 6: Control characteristics in example 1.

The control characteristics in the low-speed range for this example are shown in FIG. 6, where R*/R=0.5, the phase error estimation unit in the low-speed range 9 and the frequency and phase estimation unit 10 are operated and the same load torque is applied as in FIG. 5. The actual phase error $\Delta\theta$ can be suppressed to zero even when R*/R=0.5 because the phase error estimates $\Delta\theta_{c\_L}$ are calculated by reactive power with low sensitivity to the resistance value R.

Furthermore, in this example, the frequency command value $\omega_r^*$ is accelerated from 2% to 20% of the base frequency and decelerated from 20% to 2%. At this time, the frequency command value $\omega_r^*$ switches between the slow speed range and the estimated phase error in the medium and high speed range with a magnitude of 10%.

The low-speed range where $\omega_r^*$ is less than 10% of the base frequency is calculated using (Formula 8). The medium- to high-speed range where $\omega_r^*$ is 10% or more of the base frequency is calculated using (Formula 5). The switching characteristics from the low-speed range to the medium-high-speed range or from the medium-high-speed range to the low-speed range in this example are shown in FIG. 7.

Figure 7:
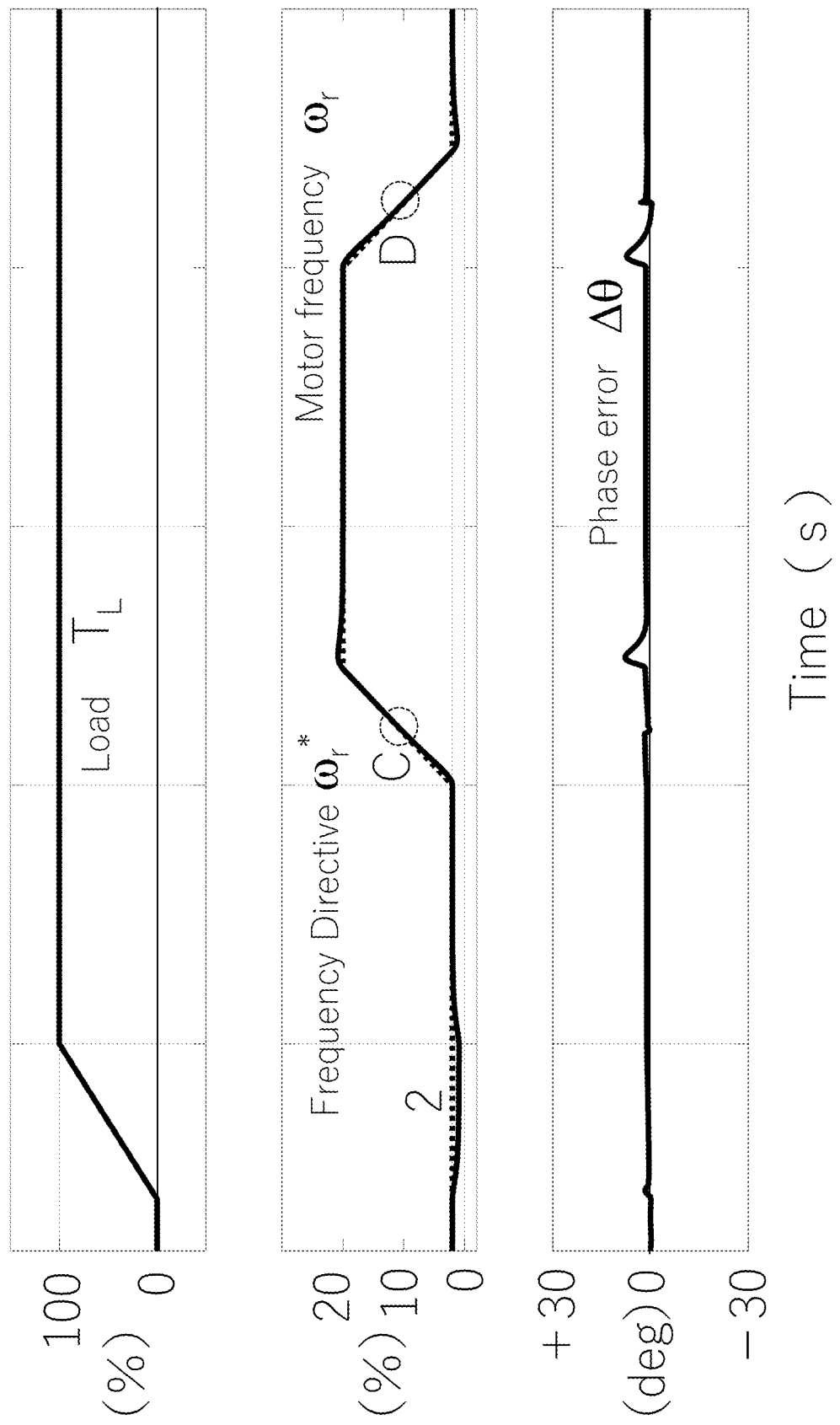
FIG. 7: Control characteristics when switching between low-speed and medium-high-speed ranges in example 1.

As shown in the middle row of FIG. 7, in the C region, the switching is made from the low-speed region to the medium-high-speed region, and in the D region, the switching is made from the medium-high-speed region to the low-speed region. Looking at the phase error $\Delta\theta$ in the lower row, the magnitude changes somewhat depending on the timing of the switching, but there is no shock to the motor frequency $\omega_r$ and no shock to the torque, indicating that the effect of this example is obvious.

In this example, $\omega_r^*$ is switched between the low speed range and the estimated phase error in the medium and high speed range at a magnitude of 10% of the base frequency, but there is no problem if $\omega_r^*$ is switched at values above zero and below 10% of the base frequency.

The phase error estimates at low speeds $\Delta\theta_{c\_L}$ may also be multiplied by a taper gain G L that varies between "1" and "0" and the estimated phase error in the medium and high speed range $\Delta\theta_{c\_H}$ may be the taper gain G H may be multiplied, respectively, and the average value of the phase error estimates may be $\Delta\theta_c$.

Figure 8:
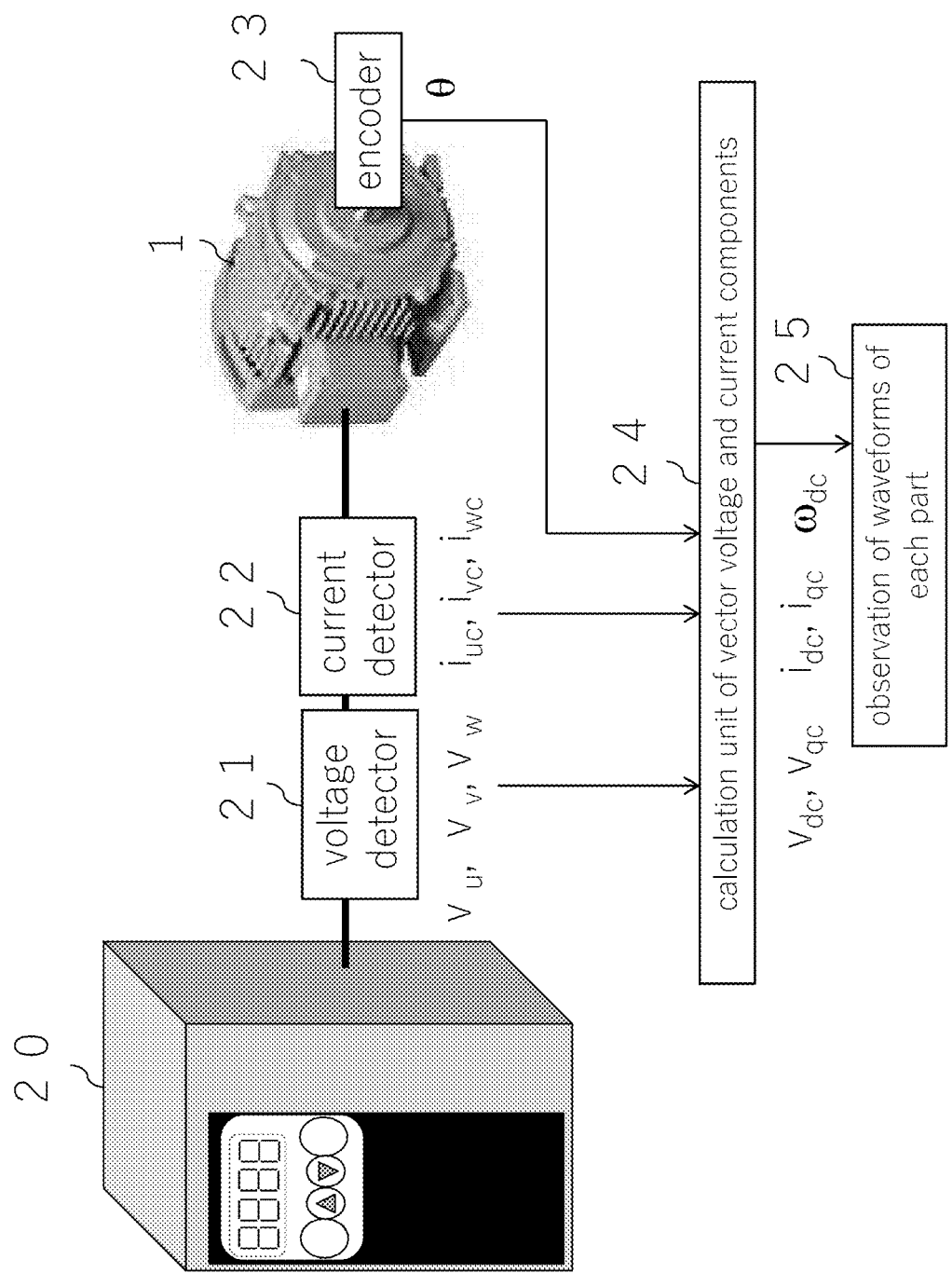
FIG. 8 Configuration diagram for checking the manifestation of the invention.

Here, the verification method when this example is adopted is explained using FIG. 8. voltage detector 21 and current detector 22 are attached to the power conversion device 20 that drives magnet motor 1, and encoder 23 is attached to the shaft of magnet motor 1. Encoder 23 is attached to the shaft of magnet motor 1.

In calculation unit of vector voltage and current components 24, three-phase AC voltage detection values ($v_{u\_c}$, $v_{v\_c}$, $v_{w\_c}$) which are outputs of voltage detector 21 and three-phase AC current detection values ($i_{u\_c}$, $i_{v\_c}$, $i_{w\_c}$) and position $\theta$ which is output of the encoder are input, and the vector voltage components $v_{d\_c}$, $v_{q\_c}$, the vector current components $i_{d\_c}$, $i_{q\_c}$ and the detected value $\omega_{d\_c}$ differentiated by position el are calculated.

In the observation of waveforms of each part 25, the phase error $\Delta\theta_{\_c\_a\_l}$ is calculated using (Formula 11).

[Formula 11]

$$\Delta\theta\_\text{cal} = \frac{-b \pm \sqrt{b^2 - 4ac}}{2a} \quad (11)$$

$$a = (L_d - L_q)(i_{qc}^2 - i_{dc}^2)$$

$$b = (2(L_d - L_q)i_{dc}^2 + K_e)i_{qc}$$

$$c = -(L_q^* - L_q)i_{qc}^2 - (L_d^* - L_d)i_{dc}^2 - (K_e^* - K_e)i_{dc}$$

By changing the magnitude of the parameters (R*, $L_d^*$, $L_q^*$, $K_e^*$) set in the controller of power converter 2, $\Delta\theta_{\_c\_a\_l}$ in (Formula 11) is calculated, and if it matches the actual phase error $\Delta\theta$, it is evident that the invention is adopted.

According to this example, in position sensor-less control that omits encoder, etc. to detect magnet motor magnet phase, even in the low speed range from stop to about 10% of the base frequency, without adjustment of magnet motor electric circuit parameters and control gain to be set in the control section (controller), the power conversion device can achieve stable and highly accurate control characteristics.

Furthermore, in the low-speed range, instead of estimating the motor frequency as in the patent document 1, this example estimates the phase error as in the medium- and high-speed range from the deviation of two types of reactive power. With such a configuration, it is possible to estimate the motor frequency (motor rotation speed) so that the phase error estimates follow its command value in the low-speed range as well as in the medium- and high-speed range, thereby preventing torque shock.

Example 2

Figure 9:
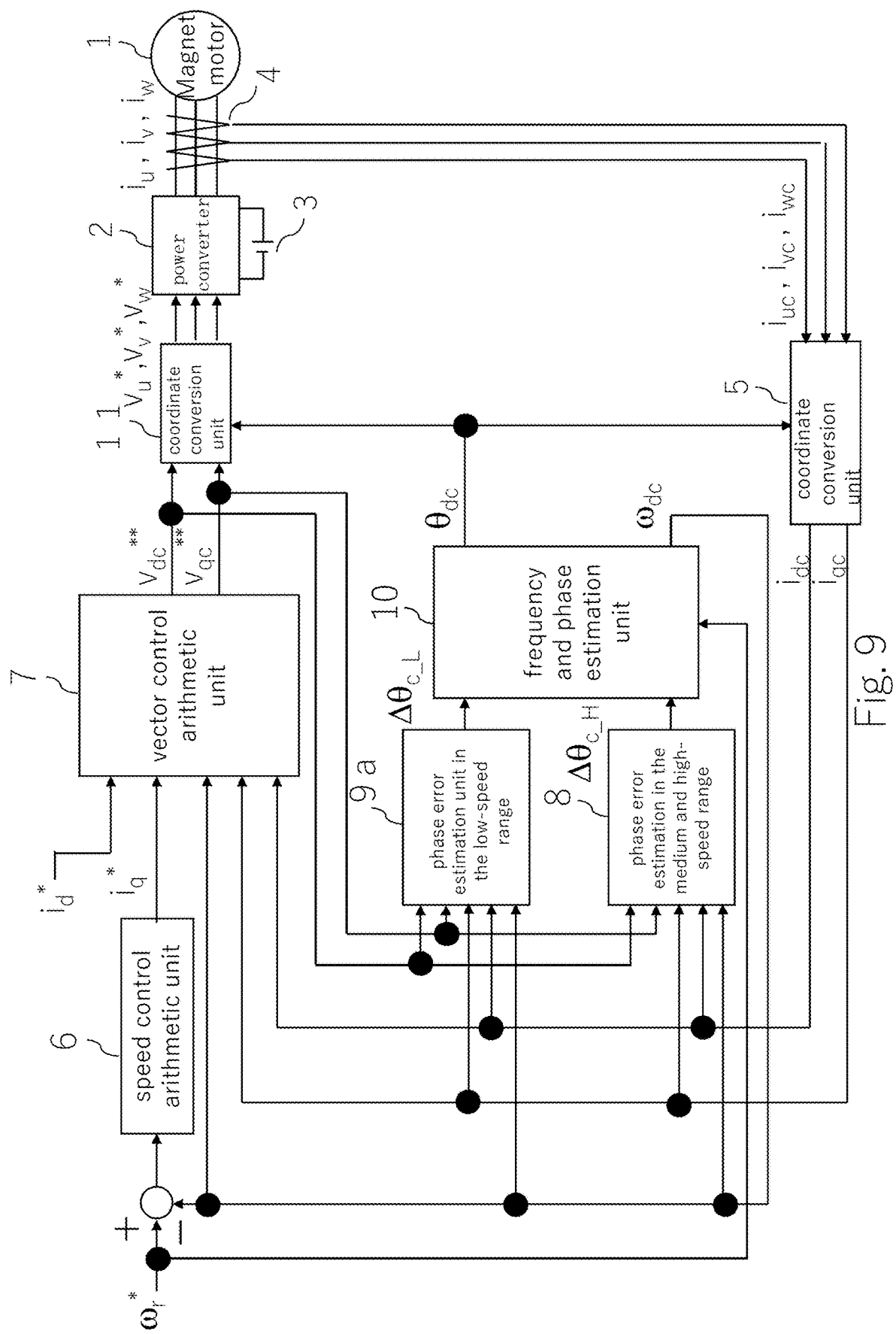
FIG. 9: System configuration diagram of power conversion device, etc. in example 2.

FIG. 9 shows the system configuration with power conversion device and magnet motor in example 2.

In example 1, the phase error estimation unit in the low-speed range 9 calculated the first reactive power $Q_c$ from the voltage command values $v_{d\_c}^{}$ and $v_{q\_c}^{}$ of the $d_c$ and $q_c$ axes and the current detection values $i_{d\_c}$ and $i_{q\_c}$. In this example, the first reactive power calculation section 9a1 calculates first reactive power $Q_c$ as the output voltage of magnet motor 1 by using the amplitude value $V_1^*$ of the voltage command for one phase of three-phase AC, the amplitude value $i_1$ of the current detection and the sine signal of the phase difference $\theta_{v\_i}$ between the voltage command and current detection values.

The magnet motor1 to phase error estimation in the medium and high-speed range 8, frequency and phase estimation unit 10, and coordinate conversion unit 11 in FIG. 9 are identical to those in FIG. 1. The same details as in example 1 are omitted.

Figure 10:
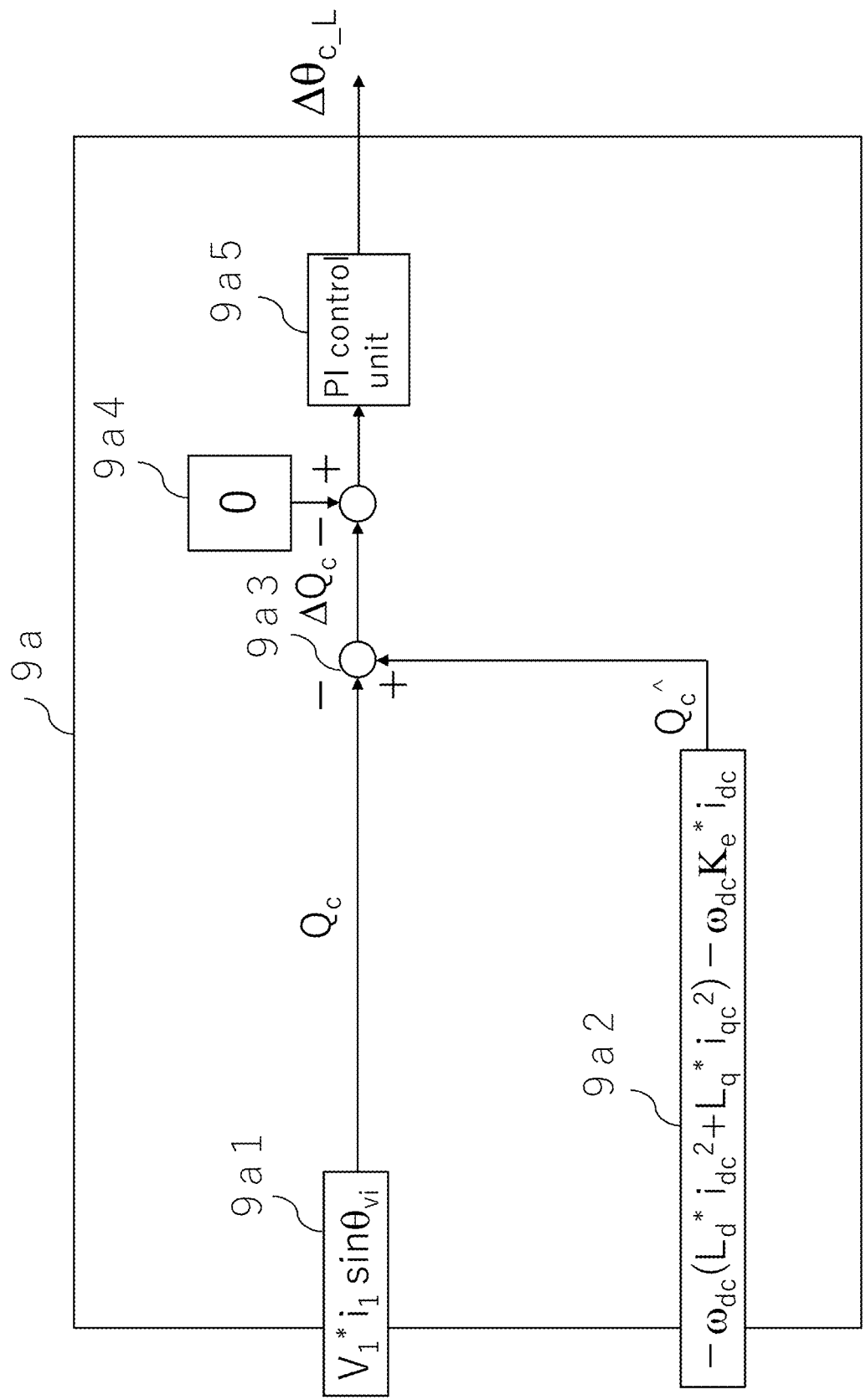
FIG. 10: Configuration diagram of the phase error estimation unit in the low-speed range in example 2.

FIG. 10 shows the phase error estimation unit 9a in the low-speed range in this example. The functional block in FIG. 10 corresponds to the phase error estimation unit in the low-speed range 9 in FIG. 2.

The second reactive power calculation section 9a2, subtraction section 9a3, command value of deviation of reactive power 9a4, and PI control section 9a5 in FIG. 10 are identical to the second reactive power calculation section 92, subtraction section 93, command value of deviation of reactive power 94, and PI control section 95 in FIG. 3.

In the same figure, the first reactive power calculation section 9a1 calculates the amplitude value $V_1^*$ of the voltage command of three-phase AC from (Formula 12), the amplitude value $i_1$ of the current detection value from (Formula 13), and the phase $\theta_{v\_i}$ from (Formula 14). Then, using (Formula 15), reactive power $Q_c$ is calculated using the voltage amplitude value $V_1^*$ of one phase of three-phase AC as the output voltage of magnet motor1, the current amplitude value $i_1$ and the sine signal of the phase difference between the voltage command and current detection value $\theta_{v\_i}$.

[Formula 12]
$$v_1^* = \sqrt{v_{dc}^{2} + v_{qc}^{2}} \tag{12}$$

[Formula 13]
$$i_1 = \sqrt{i_{dc}^2 + i_{qc}^2} \tag{13}$$

[Formula 14]
$$\theta_{vi} = \tan^{-1}\left[-\frac{v_{dc}}{v_{qc}}\right] + \tan^{-1}\left[-\frac{i_{dc}}{i_{qc}}\right] \tag{14}$$

[Formula 15]
$$Q_c = v_1^* i_1 \sin[\theta_{vi}] \tag{15}$$

According to this example, the amount of calculation can be reduced because there are fewer parameters to calculate first reactive power $Q_c$ than in example 1.

This example, which is an AC quantity, can be used to achieve the same high-precision control characteristics as in example 1.

Example 3

Figure 11:
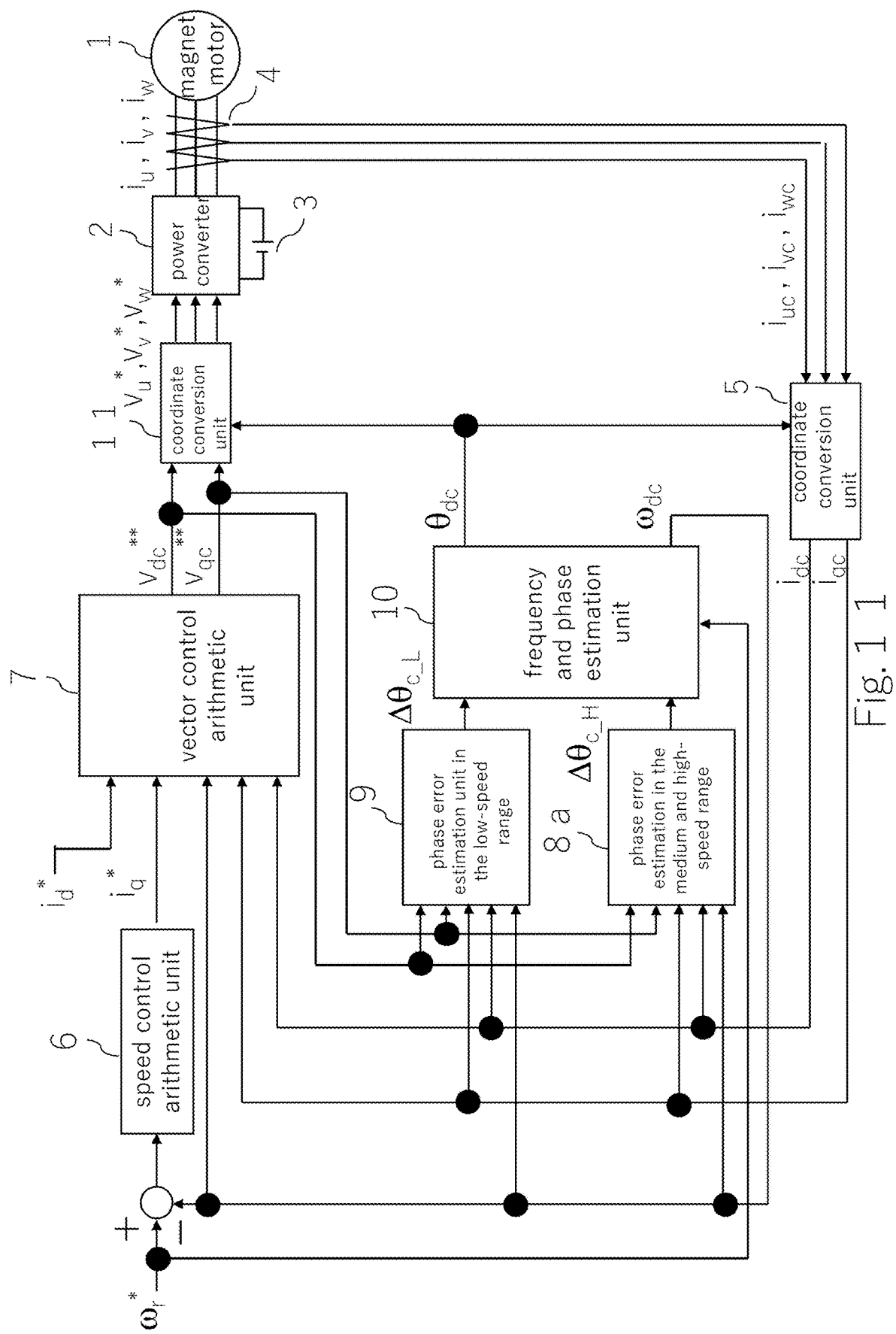
FIG. 11: System configuration diagram of power conversion device, etc. in example 3.

FIG. 11 shows a system configuration diagram with a power conversion device and magnet motor in example 3. In example 1, the phase error estimates $\Delta\theta_{c\_H}$ in the medium and high-speed range are calculated in the phase error estimation in the medium and high-speed range 8 according to (Formula 5).

In example 3, the estimation calculation section 8a of the phase error in the medium and high-speed range calculates the first active power $P_c$ from the voltage command values $v_{d\_c}^{}$ and $v_{q\_c}^{}$ of the $d_c$ and $q_c$ axes and the current detection values $i_{d\_c}$ and $i_{q\_c}$.

Figure 12:
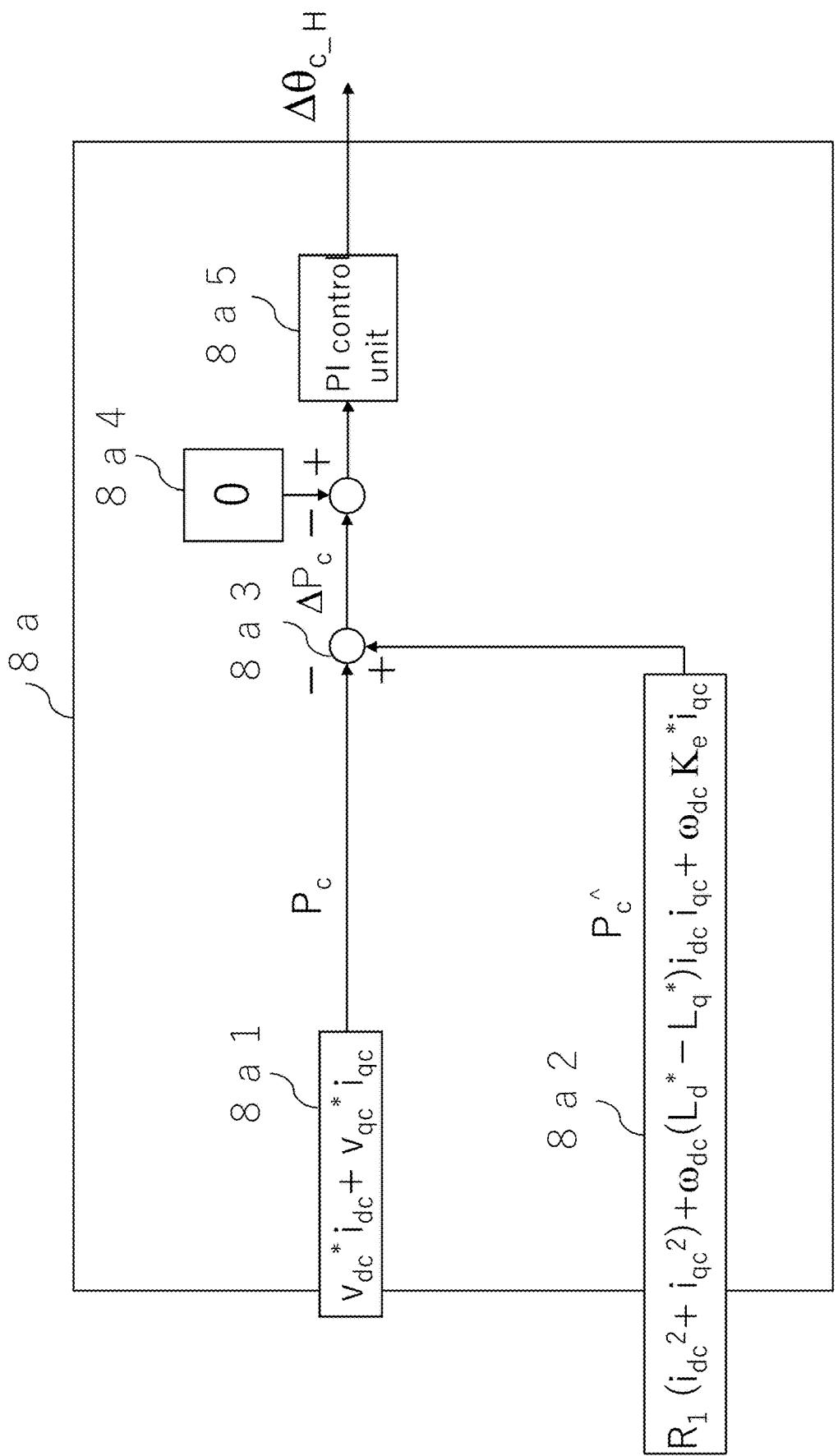
FIG. 12: Configuration diagram of the phase error estimation in the medium and high-speed range in example 3.

FIG. 12 shows the configuration of the phase error estimation calculation section 8a in the medium and high-speed range in example 3. FIG. 12 corresponds to phase error estimation in the medium and high-speed range 8 in FIG. 1.

The magnet motor1 to vector control arithmetic unit 7, phase error estimation unit in the low-speed range 9 to frequency and phase estimation unit 10 in FIG. 11 are identical to those in FIG. 1. FIG. 11 is the same as FIG. 1. The same contents as in example 1 or example 2 are omitted.

In the phase error estimation in the medium and high-speed range 8a in FIG. 12, the first active power calculation section 8a1 uses the voltage command values $v_{d\_c}^*$ and $v_{q\_c}^*$ for the $d_c$ and $q_c$ axes and the current detection values $i_{d\_c}$ and $i_{q\_c}$ for the $d_c$ and $q_c$ axes to calculate first active power $P_c$ is calculated according to (Formula 16).

[Formula 16]
$$P_c = v_{dc}^{} i_{dc} + v_{qc}^{} i_{qc} \tag{16}$$

The second active power calculation section 8a2 calculates the second active power $P_c\hat{}$ according to (Formula 17) using the current detection values $i_{d\_c}$, $i_{q\_c}$, frequency estimates $\omega_{d\_c}$, and electrical circuit parameters of magnet motor1 ($R^*$, $L_d^*$, $L_q^*$, $K_e^*$) for the $d_c$ and $q_c$ axes.

[Formula 17]
$$P_c\hat{} = R^*(i_{dc}^2 + i_{qc}^2) + \omega_{dc}(L_d^* - L_q^*)i_{dc}i_{qc} + \omega_{dc}K_e^* i_{qc} \tag{17}$$

The first active power $P_c$ and second active power $P_c\hat{}$, are input to the subtraction section 8a3, and the deviation $\Delta P_c$, is calculated. The difference between the deviation of the active power $\Delta P_c$ and the command value of the deviation of the active power is input to the PI control section 8a5 so that the deviation of the active power $\Delta P_c$, follows "0" which is the command value of the deviation of the active power 8a4.

The PI control section 8a5 calculates the estimated value $\Delta\theta_{c\_H}$ of the phase error $\Delta\theta$ in the medium to high speed range according to (Formula 18) by P(proportional)+I(integral) control.

[Formula 18]
$$\Delta\theta_{c\_H} = \left(K_{p\theta} + \frac{K_{i\theta}}{s}\right)(0 - \Delta P_c) \tag{18}$$

Where $K_{p\_\theta}$: proportional gain of the phase error estimation calculation, $K_{i\_\theta}$: integral gain of the phase error estimation calculation According to this example, compared to the estimation calculation of the phase error in the medium to high-speed range using the extended induced voltage method of example 1, the estimation calculation of the phase error in the medium to high speed range can be performed without being affected by the estimation error of inductance because the set value of inductance is not used. It also has the same effect as in example 1.

Example 4

Figure 13:
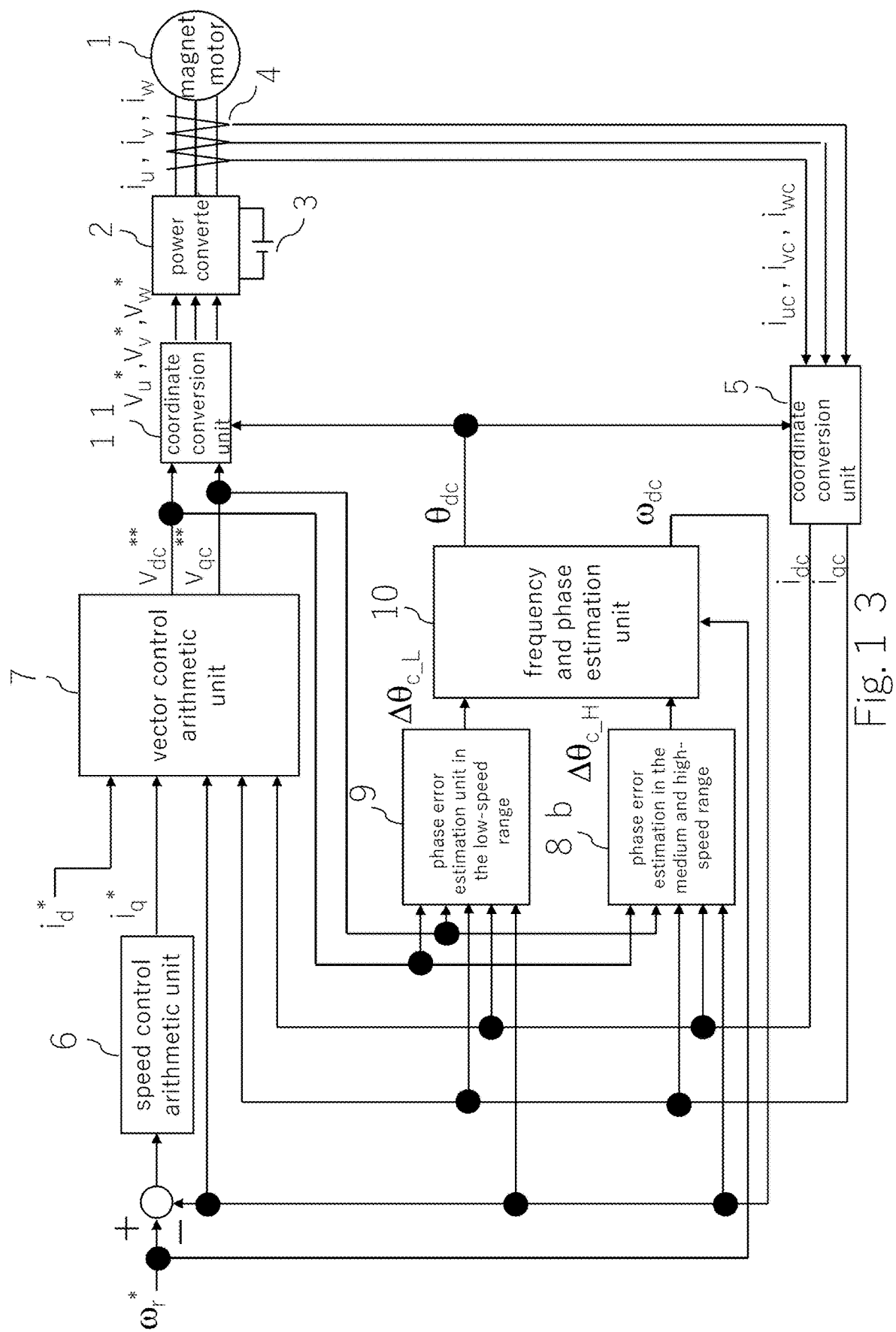
FIG. 13: System configuration diagram of power conversion device, etc. in Example 4.

FIG. 13 shows the system configuration with power conversion device and magnet motor in example 4.

In example 3, first active power $P_c$ was calculated from the voltage command values $v_{d\_c}^{}$ and $v_{q\_c}^{}$ of the $d_c$ and $q_c$ axes and current detection values $i_{d\_c}$ and $i_{q\_c}$.

In this example, the first active power calculation unit 9b1 calculates the first active power $P_c$ using the amplitude value $V_1^*$ of the three-phase AC voltage command and the cosine signals of the amplitude value $i_I$ and phase $\theta_{v\_i}$ of the current detection. The same details as in examples 1 through 3 are omitted.

Figure 14:
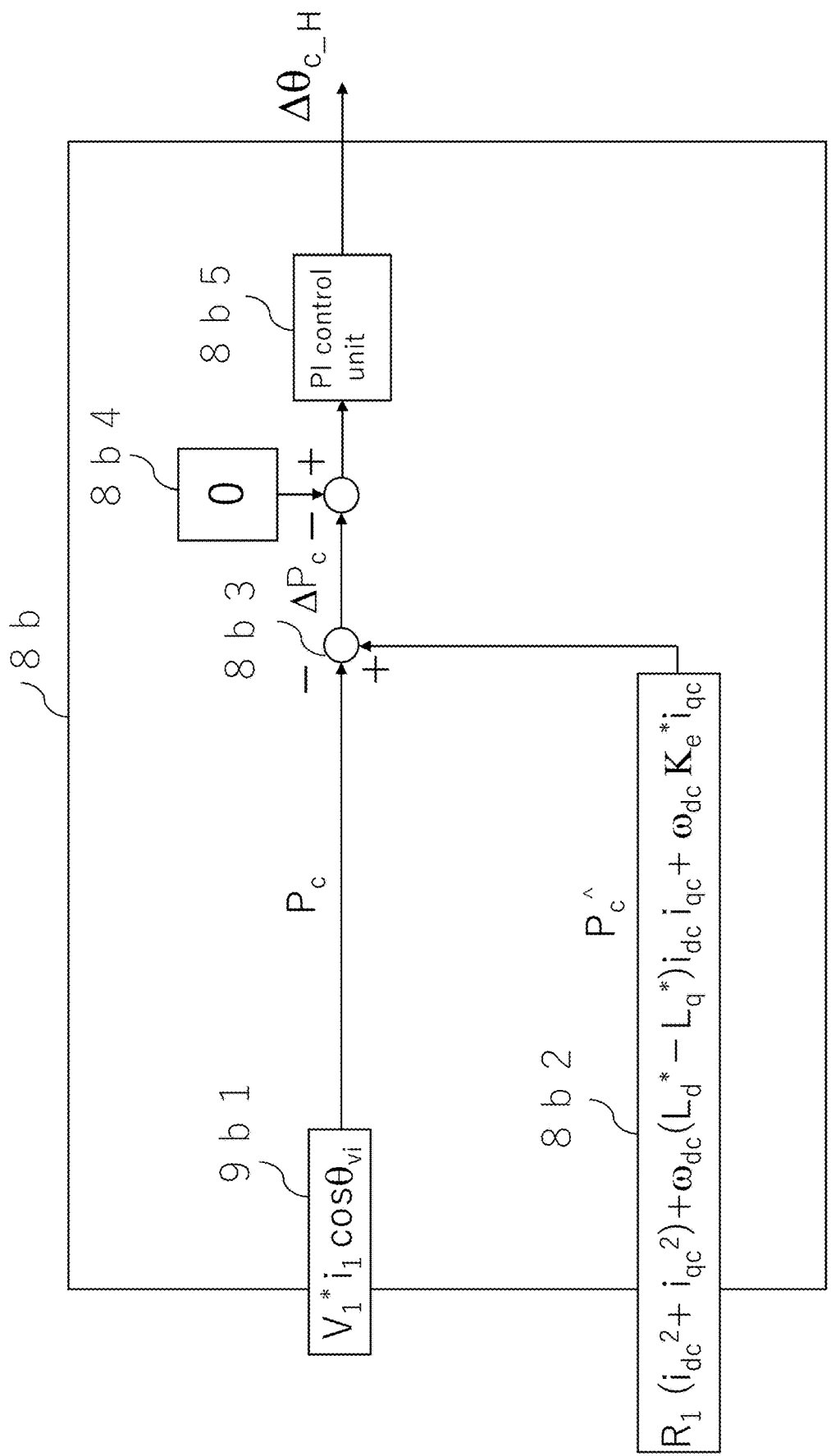
FIG. 14: Diagram of the estimation calculation section of the phase error in the medium and high-speed range in example 4.

FIG. 14 shows the phase error estimation calculation section 8b in the medium and high-speed range in example 3. FIG. 14 corresponds to the phase error estimation in the medium and high-speed range 8 in FIG. 2. In FIG. 13, magnet motor 1 to vector control arithmetic unit 7 and phase error estimation unit in the low-speed range 9 to coordinate conversion unit 11 are identical to those in FIG. 1. FIG. 13 is identical to FIG. 1.

The second active power calculation section 8b2, subtraction section 8b3, command value of deviation of active power 8b4, and PI control section 8b5 in FIG. 14 are identical to the second active power calculation section 8a2, subtraction section 8a3, command value of deviation of active power 8a4, and PI control section 8a5 in FIG. 12.

In FIG. 14, the first active power calculation section 9b1 calculates the amplitude value $V_I^*$ of the voltage command for three-phase AC, using (Formula 12) and the amplitude value of the current detection value, using (Formula 13), and the phase difference $\theta_{v\_i}$ between the voltage command and current detection values using (Formula 14). Then, the first active power calculation section 9b1 calculates the first active power $P_c$ using the cosine signals of the voltage amplitude value $V_I^*$ and current amplitude value $i_I$ for one phase of three-phase AC and the phase difference $\theta_{v\_i}$ between the voltage command value and the current detection value using (Formula 19).

[Formula 19]

$$P_c = v_I^* i_I \cos[\theta_{vi}] \quad (19)$$

According to this example, as in example 3, the estimation calculation of the phase error in the medium to high-speed range can be performed without being affected by the estimation error of the inductance, compared to example 1.

This example can be used to achieve the same high-precision control characteristics as in example 1.

Example 5

Figure 15:
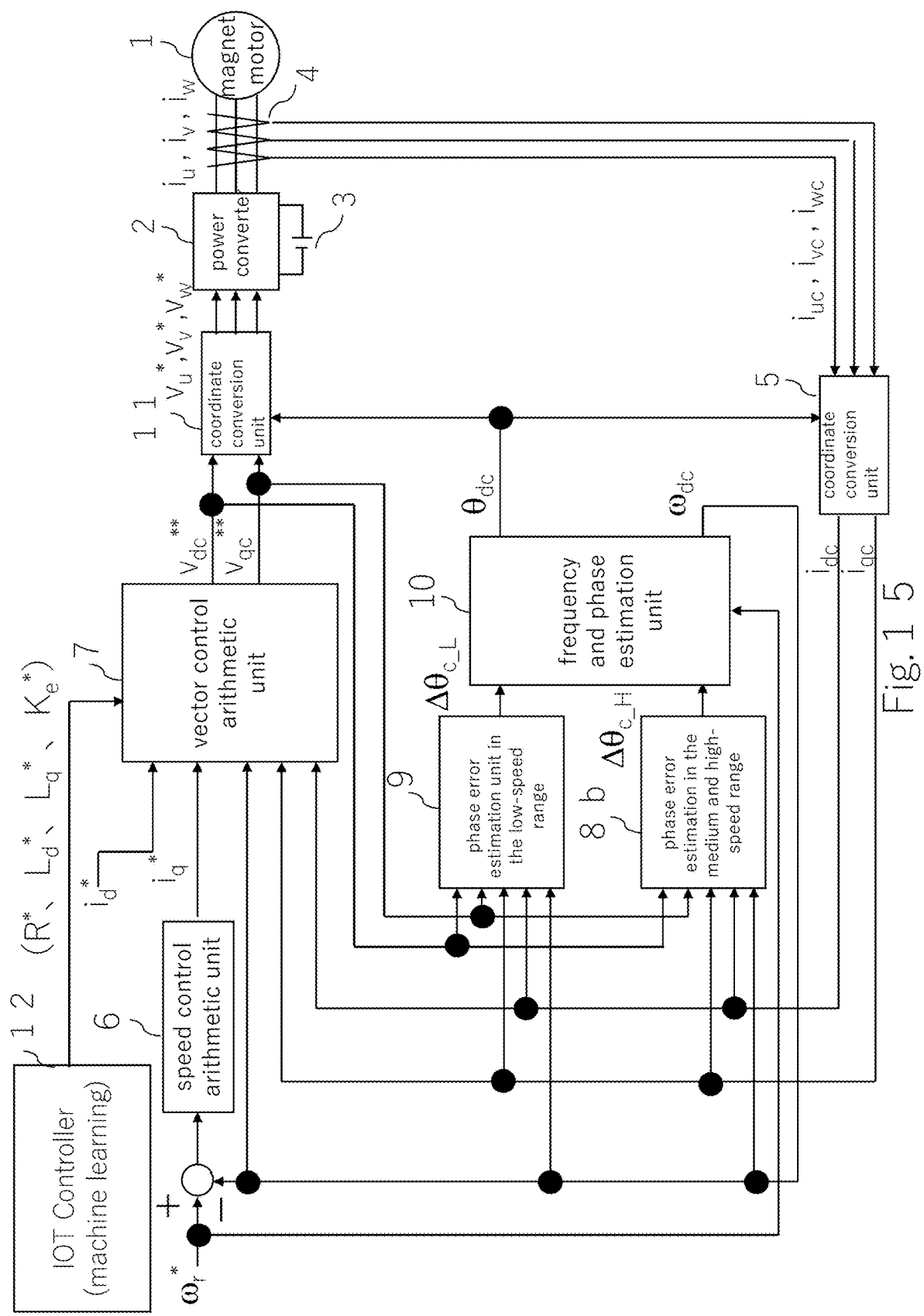
FIG. 15: System configuration diagram of power conversion device, etc. in example 5.

FIG. 15 shows a system configuration diagram with power conversion device, magnet motor, and internet of things (IOT) controller in example 5.

In examples 1 through 4, the electrical circuit parameters of magnet motor 1 are set in the controller of the power converter (e.g., microcomputer), but in this example, the control state quantities are feedback to the upper (IOT) controller and the machine-learned electrical circuit parameters are re-set to the power converter controller.

The magnet motor1 to coordinate conversion unit11 in FIG. 15 is identical to each functional block in FIG. 1. (IOT) controller 12 is an (IOT) controller that performs machine learning. The same details as in examples 1 through 4 are omitted.

In this example, the voltage command values $v_{d\_c}^{}$, $v_{qc}^{}$ and current detection values $i_{d\_c}$, $i_{qc}$, phase error estimates $\Delta\theta c$ are feedback to the higher-level (IOT) controller 12 for machine learning from current detection waveforms and other data. The machine-learned electric circuit parameters ($R^*$, $L_{dp}^*$, $L_q^*$, $K_e^*$) are re-set to the controller of power converter2, the control unit.

According to this example, the electrical circuit parameters can be re-set from the higher-level (IOT) controller 12 through machine learning of the operating conditions.

In this example, as in example 1, more stable and precise control characteristics can be achieved.

Example 6

Figure 16:
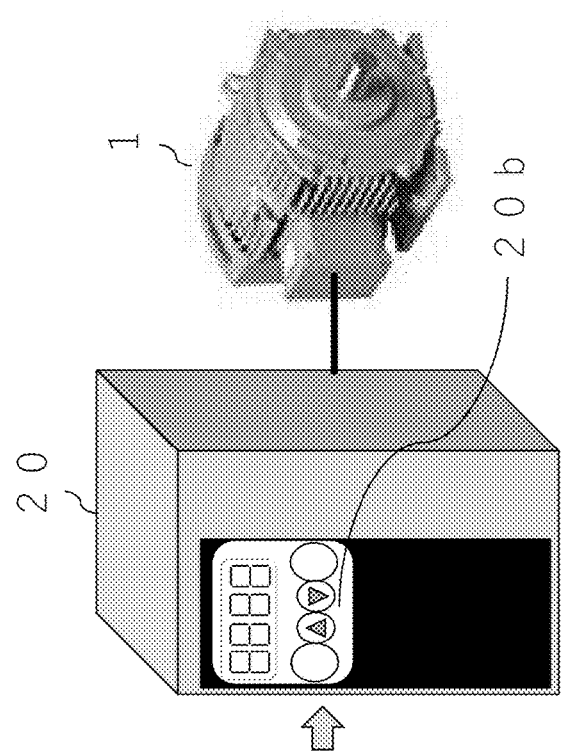
FIG. 16: System configuration diagram of power conversion device and other devices in example 6.
Figure 16:
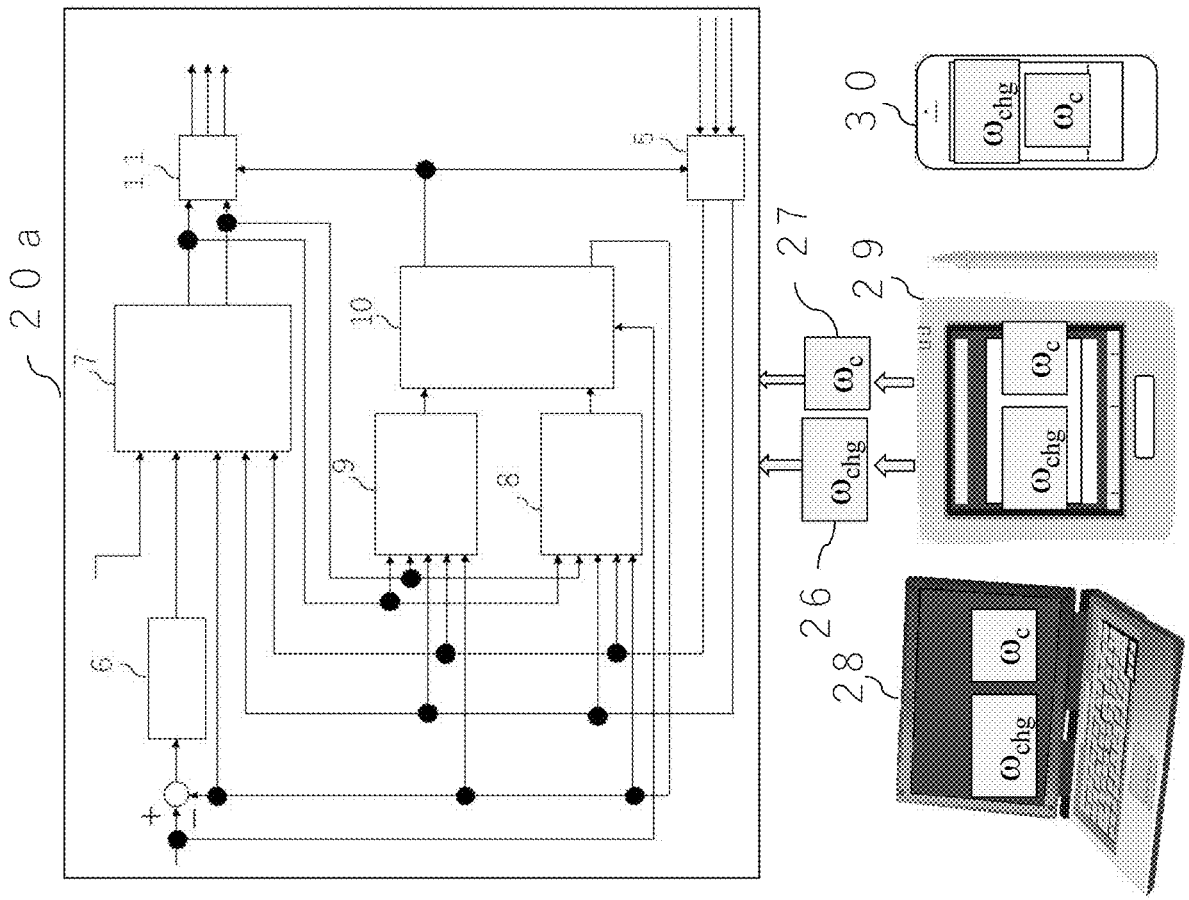

FIG. 16 is a system configuration diagram with power conversion device, magnet motor, personal computers, tablets, smartphones, and other devices in example 6.

This example is the application of this example to a magnet motor drive system. In the figure, the components magnet motor 1, coordinate conversion unit 5 to coordinate conversion unit 11 are identical to those in FIG. 1. The same contents as in examples 1 to 5 are omitted from the explanation.

Magnet motor 1, a component of FIG. 16, is driven by power conversion device 20. Power conversion device 20 includes coordinate conversion unit 5, speed control arithmetic unit 6, vector control arithmetic unit 7, phase error estimation in the medium and high-speed range 8, and phase error estimation unit in the low-volume range 9. frequency and phase estimation unit10, and coordinate conversion unit11 of FIG. 1 are implemented as software 20a.

The power converter 2, DC power supply 3, and current detector 4 of FIG. 1 are implemented as hardware in the power conversion device 20.

The software 20a "switching frequency in the low-speed/medium-high-speed range.26 $\omega_{c\_h\_g}$" and "phase error control response in the slow range.27, $\omega_c$" can be set and changed by higher-level devices such as the digital operator 20b, personal computers 28, tablets 29, smartphones 30, etc.

The switching frequency in the low-speed/medium-high-speed range 26, $\omega_{c\_h\_g}$, is input to the frequency and phase estimation unit10 shown in FIG. 4 from a higher-level device such as personal computers 28, tablets 29 and smartphones 30.

Then, the frequency and phase estimation unit 10 is configured to including compare part which compare the frequency command value $\omega_r^*$ input to the frequency and phase estimation unit 10 and the switching frequency in the low-speed/medium-high-speed range 26, $\omega_{c\_h\_q}$.

If the frequency command value $\omega_r^*$ is lower than the switching frequency in the low-speed/medium-high-speed range $\omega_{c\_h\_g}$ 26, the switching section 101 switches its output to $\Delta\theta_c = \Delta\theta_{c\_L}$ as the low-speed range. If the frequency command value $\omega_r^*$ is higher than the switching frequency in the low-speed/medium-high-speed range $\omega_{c\_h\_g}$ 26, the switching section 101 switches so that $\Delta\theta_c = \Delta\theta_{c\_H}$ is output as the medium-high-speed range of phase error estimates $\Delta\theta_c$.

The phase error control response in the slow range.27, $\omega_c$, is input to the phase error estimation unit in FIG. 3 from a higher-level device such as personal computers 28, tablets 29, smartphones 30, etc.

In such a configuration, the gains of the PI control unit 95, $Kp_{p\_ll}$ (proportional gain of PLL control) and $Ki_{p\_ll}$ (integral gain of PLL control) in (Formula 9), can be controlled based on the phase error control response in the slow range $\omega_c$ The "switching frequency in the low-speed/medium-high-speed range26 that is $W_{c\_h\_g}$" and the "phase error control response in the slow range.27 The $\omega_c$" may be set up on a fieldbus such as a programmable logic controller, a local area network connecting to a computer, or an IOT controller.

Furthermore, the configuration of the power conversion device is not limited to example 1 but may use the configurations of examples 2 through 5.

If this example is applied to magnet motor drive systems, highly accurate control characteristics can be achieved in position sensor-less vector control.

According to example 6, setting values such as switching frequency in the low-speed/medium-high-speed range26 can be changed from outside the power conversion device. Also in this example, as in example 1, more stable and precise control characteristics can be achieved.

In examples 1 through 5, the current detection values $i_{d\_c}$ and $i_{q\_c}$ were used for first reactive power $Q_c$ (Formula 6) and second reactive power $Q_c$ (Formula 7), but the current command values $i_d^*$ and $i_q^*$ may be used. The current detection values $i_{d\_c}$ and $i_{q\_c}$ were used for the first active power $P_c$ (Formula 16) and second active power $P_c$ (Formula 17), but the current command values $i_d^*$ and $i_q^*$ may also be used.

Furthermore, in examples 1 through 5, the operations shown in (Formula 4) were performed to create voltage correction values $\Delta v_{d\_c}$ and $\Delta v_{q\_c}$ from current command values $i_d^*$, $i_q^*$ and current detection values $i_{d\_c}$, $i_{q\_c}$ and to add these voltage correction values and the voltage reference value for vector control. Not limited to that, intermediate current command values $i_d^{}$ and $i_q^{}$ shown in (Formula 20) used for vector control calculation are created from current command values $i_d^*$ and $i_q^*$ and current detection values $i_{d\_c}$ and $i_{q\_c}$, and vector control calculation shown in (Formula 21) may be performed using frequency estimates $\omega_{d\_c}$ and magnet motor1 electric circuit parameters.

[Formula 20]

$$\begin{bmatrix} i_d^{**} = \left(K_{pd1} + \dfrac{K_{id1}}{s}\right)(i_d^* - i_{dc}) \\ i_q^{**} = \left(K_{pq1} + \dfrac{K_{iq1}}{s}\right)(i_q^* - i_{qc}) \end{bmatrix} \quad (20)$$

[Formula 21]

$$\begin{bmatrix} v_{dc}^{***} = R^* i_d^{**} - \omega_{dc} L_q^* \dfrac{1}{1+T_q s} i_q^{} \\ v_{qc}^{*} = R^* i_d^{**} + \omega_{dc} L_d^* \dfrac{1}{1+T_d s} i_d^{} + \omega_{dc} K_e^{} \end{bmatrix} \quad (21)$$

Where $K_{p\,d\,1}$: proportional gain of current control of $d_c$ axis, $K_{i\,d\,1}$: integral gain of current control of $d_c$ axis, $K_{p\,q\,1}$ proportional gain of current control of $q_c$ axis, $K_{i\,q\,1}$ integral gain of current control of $q_c$ axis, $T_d$: electrical time constant of d axis ($L_d/R$), $T_q$: electrical time constant of q axis ($L_q/R$)

Alternatively, from the current command values $i_d^*$ and $i_q^*$ and the current detection values $i_{d\_c}$ and $i_{q\_c}$, the voltage correction values $\Delta v_{d\_p}^*$ for the proportional component of $d_c$ axis, $\Delta v_{d\_i}^*$ for the integral component of $d_c$ axis, $\Delta v_{q\_p}^*$ for the proportional component of $q_c$ axis, and $\Delta v_{g\_i}^*$ for the integral component of $q_c$ axis, which are used for vector control calculation, are created using (Formula 22) and the estimated frequency value $\omega_{d\_c}$ and the electrical circuit parameters of magnet motor1 may be used to perform the vector control operations shown in (Formula 23).

[Formula 22]

$$\begin{bmatrix} \Delta v_{d\_p}^* = K_{pd2}(i_d^* - i_{dc}) \\ \Delta v_{d\_i}^* = \dfrac{K_{id2}}{s}(i_d^* - i_{dc}) \\ \Delta v_{q\_p}^* = K_{pq2}(i_q^* - i_{qc}) \\ \Delta v_{q\_i}^* = \dfrac{K_{iq2}}{s}(i_q^* - i_{qc}) \end{bmatrix} \quad (22)$$

[Formula 23]

$$\begin{bmatrix} v_{dc}^{****} = (\Delta v_{d\_p}^* + \Delta v_{d\_i}^*) - \omega_{dc} \dfrac{L_q^*}{R^*} \Delta v_{q\_i}^* \\ v_{qc}^{****} = (\Delta v_{q\_p}^* + \Delta v_{q\_i}^*) + \omega_{dc} \dfrac{L_d^*}{R^*} \Delta v_{d\_i}^* + \omega_{dc} K_e^* \end{bmatrix} \quad (23)$$

Where $K_{p\,d\,2}$: proportional gain of current control of $d_c$ axis, $K_{i\,d\,2}$: integral gain of current control of $d_c$ axis, $K_{p\,q\,2}$: proportional gain of current control of $q_c$ axis, $K_{i\,q\,2}$ integral gain of current control of $q_c$ axis The vector control operation shown in (Formula 24) may also be performed using the primary delay signal $i_{q\,c\,t\,d}$ of the current command value $i_d^*$ of the $d_c$ axis and the current detection value $i_{q\_c}$ of the $q_c$ axis, frequency estimates $\omega_{dc}$ and the electrical circuit parameters of magnet motor 1.

[Formula 24]

$$\begin{bmatrix} v_{dc}^{****} = R^* i_d^* - \omega_{dc} L_q^* i_{qctd} \\ v_{qc}^{****} = R^* i_{qctd} + \omega_{dc} L_d^* i_d^* + \omega_{dc} K_e^{**} \end{bmatrix} \quad (24)$$

In examples 1 to 6, the switching device that constitutes power converter 2 may be a Si (silicon) semiconductor device or a wide bandgap semiconductor device such as SiC (silicon carbide) or GaN (gallium nitride).

REFERENCE SIGNS LIST

1 . . . magnet motor
2 . . . power converter
3 . . . DC power supply
4 . . . current detector
5 . . . coordinate conversion unit
6 . . . speed control arithmetic unit
7 . . . vector control arithmetic unit
8 . . . phase error estimation in the medium and high-speed range
9 . . . phase error estimation unit in the low-speed range
10 . . . frequency and phase estimation unit
11 . . . coordinate conversion unit
20 . . . power conversion device
20a . . . power conversion device software part
20b . . . power conversion device digital operator
21 . . . voltage detector
22 . . . current detector
23 . . . encoder
24 . . . calculation unit of vector voltage and current components
25 . . . observation of waveforms of each part
26 . . . switching frequency in the low-speed/medium-high-speed range
27 . . . phase error control response in the slow range.
28 . . . personal computers
29 . . . tablet
30 . . . smartphones
$i_d^*$ . . . d-axis current command value
$i_q^*$ . . . q-axis current command value
$\omega_{d\_c}$ . . . frequency estimates $\omega_r$ ... magnet motor frequency $v_{dc}^*, v_{dc}^{}, v_{dc}^{}, v_{dc}^{*}, v_{dc}^{}, v_{dc}^{***}, \ldots$ d-axis voltage command value $v_{qc}^*, v_{qc}^{}, v_{qc}^{}, v_{qc}^{*}, v_{qc}^{}, v_{qc}^{***}, \ldots$ q-axis voltage command value $Q_c$ ... first reactive power $Q_c\hat{\ }$ ... second reactive power $P_c$ ... first active power $P_c\hat{\ }$ ... second active power $\Delta\theta_{c\_L}$ ... phase error estimates at low speeds $\Delta\theta_{c\_H}$ ... estimated phase error in the medium and high speed range $\Delta\theta_c$ ... phase error estimates

The invention claimed is:

1. A power conversion apparatus comprising:
a power converter that outputs a signal to a motor that changes an output frequency, an output voltage, and an output current of the motor;
a control unit that controls the power converter;
wherein the power converter is configured to calculate:
a first power from the output voltage and the output current;
a second power from the output current, electrical circuit parameters, and frequency estimates;
wherein in order that the first power follows the second power, in a low speed region, a first phase error estimation value, which is a deviation between a control phase and a magnet phase of the magnet motor, is calculated, in a medium-high speed range, a second phase error estimation value, which is a deviation between the control phase and the magnet phase of the magnet motor, is calculated, a deviation between the first phase error estimation value or the second phase error estimation value and a phase error command value is input to a proportional integral control unit so that the first phase error estimation value or the second phase error estimation value follows the phase error command value.

2. The power conversion apparatus according to claim 1, wherein the first power and the second power are a first reactive power and a second reactive power, respectively.

3. The power conversion apparatus according to claim 1, wherein the control unit calculates the first phase error estimation value by proportional control and integration control so that the deviation between the first power and the second power is zero.

4. The power conversion apparatus according to claim 3, wherein the control unit calculates the first reactive power and the second reactive power if the rotation speed of the motor is in a low speed range, and the first phase error estimation value is calculated by proportionally controlling and integrating the deviation of the first reactive power and the second reactive power to be zero, and
calculates the first active power and the second active power if the rotation speed of the motor is in a medium and high speed range, and the second phase error estimation value is calculated by proportionally controlling and integrating the deviation of the first active power and the second active power to be zero.

5. The power conversion apparatus according to claim 3, wherein the control unit calculates the first reactive power and the second reactive power if the rotation speed of the motor is in a low speed range, and the first phase error estimation value is calculated by proportionally controlling and integrating the deviation of the first reactive power and the second reactive power to be zero, and
calculates the second phase error estimation value by an extended induced voltage method if the rotation speed of the motor is in a medium and high speed range.

6. The power conversion apparatus according to claim 1, wherein the control unit feeds back to an IOT controller, which is a higher-level device, and analyzes the output voltage and the output current, and the first phase error estimation value or the second phase error estimation value, and modifies the electrical circuit parameters of the motor.

* * * * *